(12) United States Patent
Martinez et al.

(10) Patent No.: US 8,432,485 B1
(45) Date of Patent: Apr. 30, 2013

(54) OPTIMIZED DESIGNS FOR EMBEDDING WEBCAM MODULES WITH SUPERIOR IMAGE QUALITY IN ELECTRONICS DISPLAYS

(75) Inventors: Mark Martinez, San Francisco, CA (US); Ali Moayer, Castro Valley, CA (US); Kenneth Ling, San Francisco, CA (US); Philippe Depallens, Mountain View, CA (US)

(73) Assignee: Logitech Europe S.A., Morges (CH)

( * ) Notice: Subject to any disclaimer, the term of this patent is extended or adjusted under 35 U.S.C. 154(b) by 599 days.

(21) Appl. No.: 12/338,602

(22) Filed: Dec. 18, 2008

Related U.S. Application Data

(60) Provisional application No. 61/015,112, filed on Dec. 19, 2007, provisional application No. 61/046,629, filed on Apr. 21, 2008.

(51) Int. Cl.
*H04N 5/225* (2006.01)
*G03B 13/00* (2006.01)

(52) U.S. Cl.
USPC ......... 348/373; 348/207.1; 348/376; 348/345

(58) Field of Classification Search ............... 348/207.1, 348/333.1, 347, 175, 156, 374, 346, 375, 348/376, 373; 292/138
See application file for complete search history.

(56) References Cited

U.S. PATENT DOCUMENTS

| | | | |
|---|---|---|---|
| 5,726,684 A | 3/1998 | Blankenship et al. | |
| 5,861,873 A | 1/1999 | Kikinis | |
| 6,141,052 A | 10/2000 | Fukumitsu | |
| 6,304,249 B1 | 10/2001 | Derocher et al. | |
| 6,476,795 B1 | 11/2002 | Derocher et al. | |
| 6,930,725 B1 | 8/2005 | Hayashi | |
| 6,970,156 B1 | 11/2005 | Silverstein | |
| 7,046,296 B2 * | 5/2006 | Shinomiya | 348/374 |
| 7,117,587 B2 * | 10/2006 | Chen et al. | 29/827 |

(Continued)

FOREIGN PATENT DOCUMENTS

| | | |
|---|---|---|
| CN | 2718649 | 8/2005 |
| GB | 2411452 A | 8/2005 |

OTHER PUBLICATIONS

Final Office Action for U.S. Appl. No. 11/478,898 mailed on Nov. 13, 2008; 8 pages.

(Continued)

*Primary Examiner* — Tuan Ho
*Assistant Examiner* — Shahbaz Nazrul
(74) *Attorney, Agent, or Firm* — Kilpatrick Townsend & Stockton LLP

(57) ABSTRACT

The present invention is an apparatus and method of manufacture for providing image capturing modules which can be embedded into thin displays (e.g., in laptop computers) while providing for improved image quality. In accordance with several embodiments, a webcam module embedded in a display has multiple positions. A first position (or a "rest" or "park" position) is the position of the webcam module when it is not in use. In this first position of the webcam module, it is in its most compact configuration, and lends itself to integration into a very thin display. In other positions, the webcam module has a more expanded configuration, thus leading to better image quality. Such an expanded configuration leads, amongst other things, to a larger depth of focus. In one embodiment, a stepped PCB is used to provide good image quality while maintaining a compact form factor as well as structural rigidity.

15 Claims, 27 Drawing Sheets

U.S. PATENT DOCUMENTS

| | | | |
|---|---|---|---|
| 7,126,816 B2 * | 10/2006 | Krah | 361/679.55 |
| 7,489,525 B2 * | 2/2009 | Cheng et al. | 361/809 |
| 7,554,523 B2 * | 6/2009 | Chang et al. | 345/156 |
| 2003/0099395 A1 * | 5/2003 | Wang et al. | 382/165 |
| 2004/0012568 A1 | 1/2004 | Velikov et al. | |
| 2005/0087671 A1 | 4/2005 | Park | |
| 2005/0276009 A1 * | 12/2005 | Kim | 361/683 |
| 2006/0022943 A1 | 2/2006 | Johnson et al. | |
| 2006/0221206 A1 | 10/2006 | Lin et al. | |
| 2007/0018949 A1 | 1/2007 | Chang et al. | |
| 2008/0013262 A1 | 1/2008 | Stanford et al. | |
| 2008/0123314 A1 * | 5/2008 | Cheng et al. | 361/809 |
| 2008/0143871 A1 * | 6/2008 | Go | 348/374 |
| 2008/0252772 A1 * | 10/2008 | Nozaki | 348/340 |

OTHER PUBLICATIONS

Non-Final Office Action for U.S. Appl. No. 11/478,898 mailed on May 27, 2008; 17 pages.

"An Improved USB Webcam," Research Disclosure Journal, Sep. 2004, Kenneth Mason Publications Ltd, 2 pages.

* cited by examiner

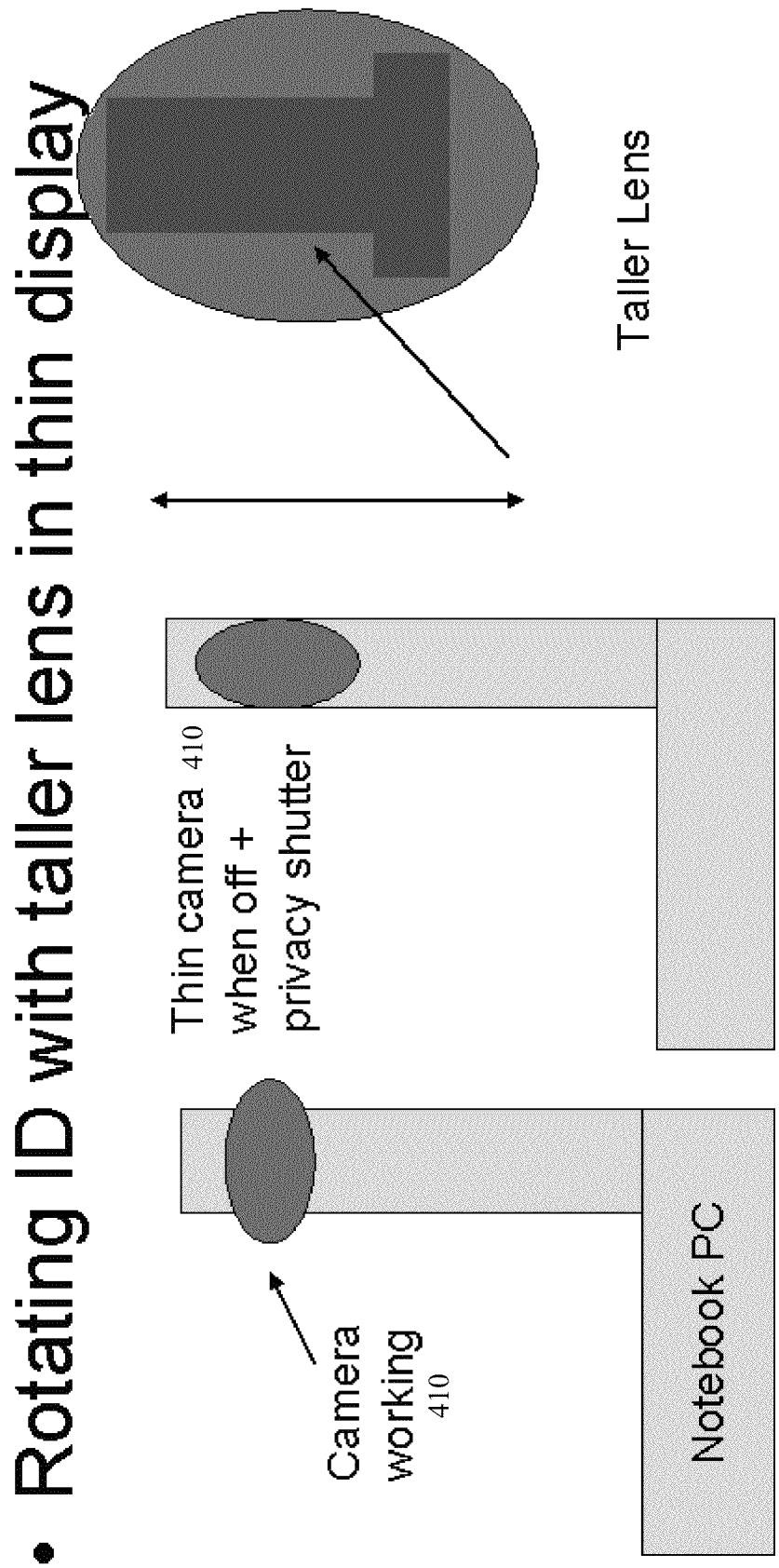

OPTIMIZED DESIGNS FOR EMBEDDING WEBCAM MODULES WITH SUPERIOR IMAGE QUALITY IN ELECTRONICS DISPLAYS

CROSS-REFERENCES TO RELATED APPLICATIONS

This application claims the benefit of, and priority to, U.S. provisional application No. 61/015,112, entitled "Optimized Designs for Embedding Webcam Modules in Electronic Displays", filed on Dec. 19, 2007, and is hereby incorporated herein in its entirety.

This application claims the benefit of, and priority to, U.S. Provisional application No. 61/046,629, entitled "Use of flex cables for embedding webcam modules in electronics displays", filed on Apr. 21, 2008, and is hereby incorporated herein in its entirety.

This application is related to co-pending application Ser. No. 11/478,898, filed on Jun. 30, 2006, entitled "Computer Monitor with Detachable Module", which is owned by the assignee of the present invention, and which is hereby incorporated herein in its entirety.

BACKGROUND OF THE INVENTION

1. Field of the Invention

This invention relates generally to embedded cameras, and more particularly, to thin webcams which do not compromise on image quality.

2. Description of the Related Art

It is becoming increasingly common for webcams (or other image capture devices) to be integrated into laptops or other electronic displays. Such integration of webcams into laptops etc. provides significant advantages (such as ease of portability, etc.). However, there are several issues associated with such integration as well. In particular, laptops are becoming increasingly thinner, and as a result, any webcam integrated into the laptop also needs to be very thin. However, a webcam that is very thin necessarily has a small depth of focus, thus compromising image quality.

Thus consumers are currently forced to choose between a larger webcam embedded in a device which is thicker and bulkier, and a thinner webcam embedded in an easier to handle device where the thinner webcam provides poorer image quality. Current webcam modules in displays (e.g., in laptop/notebook computers) have poor image quality. An indication of the extent to which current notebook webcam module image quality is suffering is offered by the fact that some original equipment manufacturers (OEMs) are retreating back from 1.3 Mega Pixel designs to VGA solutions, because the higher quality solutions are not viable in image capturing modules embedded in the increasingly popular thinner display panels.

In conventional webcam modules, an inherent tradeoff is necessary, because sleek notebook/display designs call for thin display bezels, while high quality webcam optics call for longer optics paths. As mentioned above, in several cases, current size restrictions for embedded webcam modules cause significant compromise in image quality.

There is thus a need for a webcam module which can fit into small spaces, but provide better image quality than anything currently available. Further, there is a need for a webcam module which has a form factor thin enough to be accommodated into a thin device, while still providing a sufficient focal length to provide good image quality. Further still, there is a need for an embedded webcam module which can easily switch from one position to another, where one position provides for a thin form factor, and the second position provides for improved image quality.

SUMMARY OF THE INVENTION

Various embodiments of the present invention provide for image capturing modules which can be embedded into thin displays (e.g., in laptop computers) and which provide for improved image quality. In accordance with several embodiments, a webcam module embedded in a display has multiple positions. A first position (or a "rest" or "park" position) is the position of the webcam module when it is not in use. In this first position of the webcam module, it is in its most compact configuration, and lends itself to integration into a very thin display. For instance, in one embodiment, this is the position of the webcam module when a laptop into which the webcam module is integrated, is closed. In other positions, the webcam module has a more expanded configuration, thus leading to better image quality. Such an expanded configuration leads, amongst other things, to a larger depth of focus. This can be achieved in some embodiments, for instance, by increasing the distance between a lens and a sensor in the webcam module. In other embodiments, there is no change in the relative position of the lens and the sensor—instead, the webcam module has a closed (or park) position in which the webcam is not used, and at least one open (or view) position. In such embodiments, the closed configuration allows for a more compact configuration of the webcam module integrated into the display, while the open configuration allows for good image quality.

Various different mechanisms can be used to facilitate the different positions of the webcam module. For instance, in one embodiment, the webcam module can be popped out by pushing upon it so that it protrudes from the display. In another embodiment, the webcam module is attached to the display from only one side (e.g., using a swivel joint), and can be pulled out from the plane of the display. In some such embodiments, the lens is at the other end of the webcam module. In some embodiments, the webcam module can also be rotated to change its orientation. In some such embodiments, the webcam module is detachable from the display, and can be replaced with other modules. In some such embodiments, an electrical connection (e.g., a USB or mini-USB connector) is also provided to connect the webcam module to the display.

In yet another embodiment, the webcam module is rotatable around an axis in the plane of the display. In some such embodiments, the bottom portion of the webcam module in the park position becomes the front portion of the webcam module when it is in use. That is, in one embodiment, the webcam module is rotated 90 degrees around the axis, so as to make the lens face the image to be captured. Such embodiments utilize the fact that the vertical space available around a webcam module in a thin display is sometimes greater than the thickness of the display.

In still another embodiment, a stepped printed circuit board (PCB) is used. Such a stepped PCB has a thin portion and some thicker portions. The optical module is mounted upon the thin portion so as to accommodate the optical module, while the rest of the substrate is thicker to provide additional stability. Such embodiments allow for a more compact form factor for the webcam module, while still maintaining a high image quality.

The features and advantages described in this summary and the following detailed description are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

The invention has other advantages and features which will be more readily apparent from the following detailed description of the invention and the appended claims, when taken in conjunction with the accompanying drawing, in which:

FIG. 4A is a view of a laptop computer with an embedded webcam module in accordance with an embodiment of the present invention, where the webcam module needs to be turned around a rotation axis so as to be used.

FIG. 4B illustrates the webcam module in FIG. 4A when not in use.

FIG. 4C illustrates that the height of the webcam module is greater than its depth when not in use, in accordance with an embodiment of the present invention.

DETAILED DESCRIPTION OF THE INVENTION

Figure 1A:
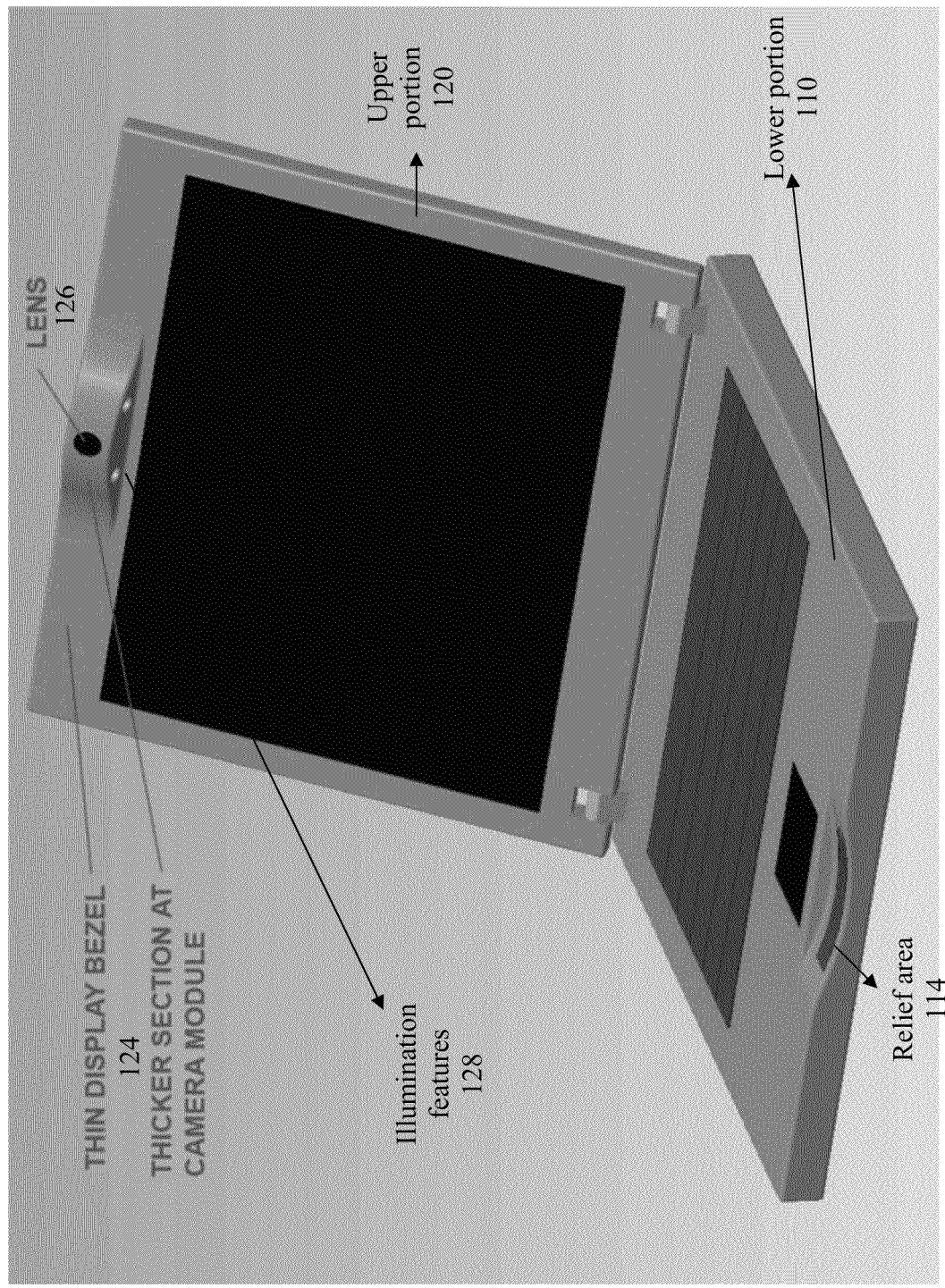
FIG. 1A illustrates a laptop computer in accordance with an embodiment of the present invention, where the embedded webcam module protrudes beyond the display.

The figures (or drawings) depict a preferred embodiment of the present invention for purposes of illustration only. It is noted that similar or like reference numbers in the figures may indicate similar or like functionality. One of skill in the art will readily recognize from the following discussion that alternative embodiments of the structures and methods disclosed herein may be employed without departing from the principles of the invention(s) herein. It is to be noted that the following discussion relates to video, audio and/or still image data. For convenience, in some places "image" or other similar terms may be used in this application. Where applicable, these are to be construed as including any such data capturable by an image capture device. Further, it is to be noted that the terms "camera" and "webcam" are used various times in this discussion. Where applicable, these term includes various image capture devices such as, but not limited to, digital still cameras, video cameras, a combination of the two, webcams, wireless webcams, Personal Digital Assistants (PDAs), cell phones with image capturing abilities, portable media players, and so on. It is to be noted that various embodiments of the present invention could be used in the context of any such image capturing devices.

In addition, it is to be noted that various embodiments of the present invention can be used for such image capturing devices embedded (or embeddable) in any device, such as the display of a laptop/notebook, a display used with a desktop computer, a Personal Digital Assistants, a cell-phone, and so on. While most of the ensuing discussion mentions a webcam embedded in the bezel of a display of a laptop, the various embodiments described herein are not limited to such implementations. It is also to be noted that a webcam in accordance with embodiments of the present invention may be embedded in the display housing or display itself, rather than in the bezel of the display. The various embodiments of the present invention relate to ways to package webcam modules in a small space while still providing for the key dimensions that drive optics performance of the webcam. A webcam module in accordance with the present invention includes a housing, sensor, and a lens which captures the light and delivers it onto the sensor. Webcam modules in accordance with various embodiments of the present invention increase quality of the captured images. As an example, embodiments in accordance with this invention allow for high performance and longer optics while also allowing for thin notebook display bezels. In various different ways, a longer optics path (also called the "Z distance" or the "Z height") is provided, thus leading to better image quality, while still allowing for the embedding device (e.g., laptop) to maintain a thin appearance. An increased Z distance or Z height allows for the light rays received by the sensor in the webcam module to be more parallel, since they don't need to bend a lot as they would in a small Z distance. In one embodiment, this is done by increasing the distance between the lens and the sensor. In one embodiment, this is done by having a webcam with a longer optical length embedded in a display in a storage position, which can then be opened up to a viewing position. In one embodiment, such a webcam has a longer lens, which again can be accommodated in a storage position in the display.

Locally Raised Areas at Webcam Module that Provide Increased Z Height while Maintaining Overall Panel Thinness In some embodiments, the webcam module is raised, or is thicker than the rest of the panel in which it is embedded.

In one embodiment, the extra thickness of the webcam module is accommodated into the laptop in some way. FIG. 1A illustrates a laptop computer in accordance with an embodiment of the present invention. The laptop computer has a lower portion 110 (comprised mainly of the keyboard etc.) and an upper portion 120 (comprised mainly of the display 122). The display 122 is surrounded by a thin bezel 124. A webcam module is embedded in the bezel 124. The lens 126 of the webcam module is visible. Additionally, two lights 128 are also visible underneath the webcam module.

Figure 1B:
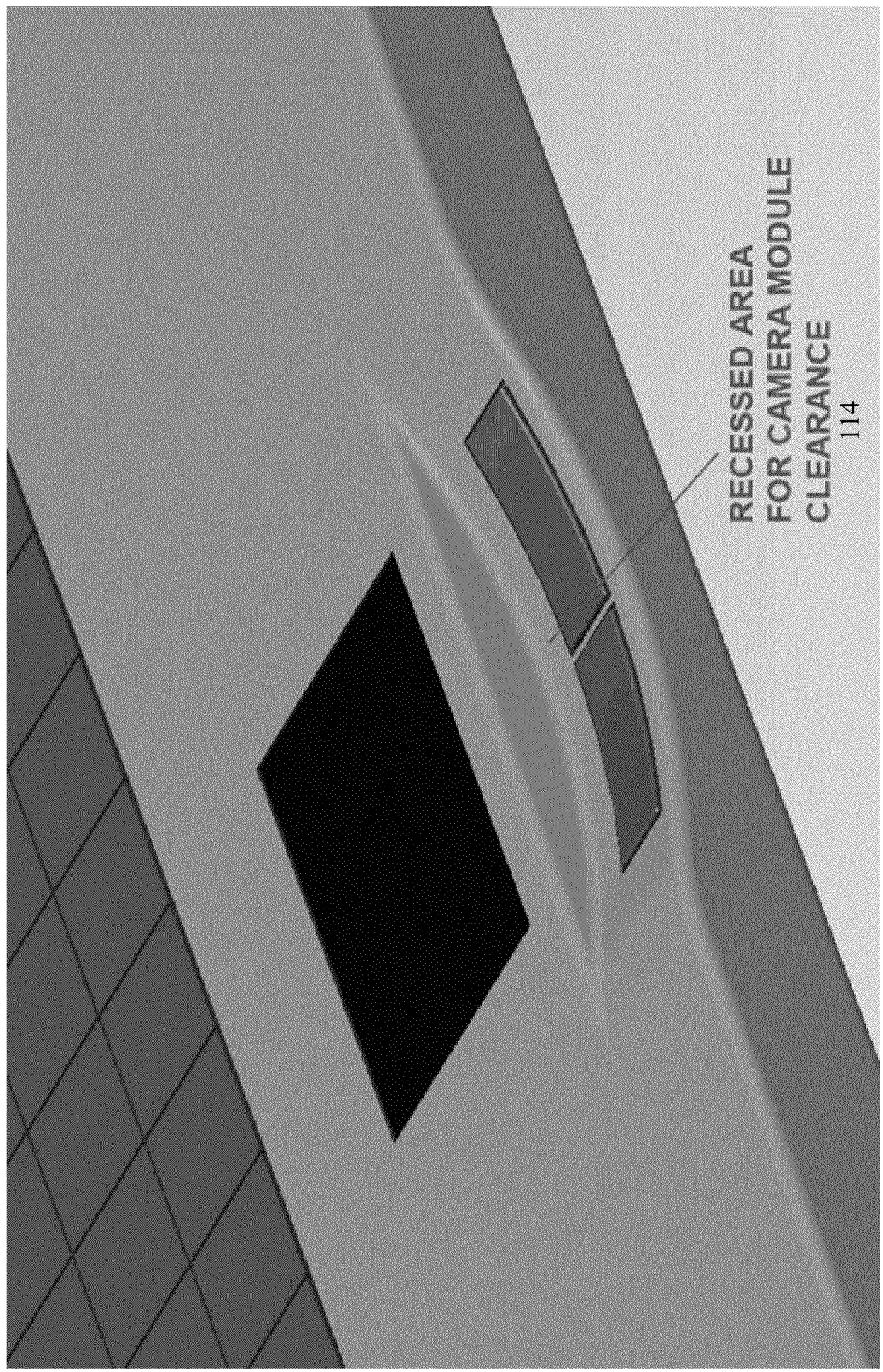
FIG. 1B shows a closer view of the relief area on the bottom case of the laptop computer shown in FIG. 1A, for accommodating the webcam module when the laptop is closed.

As can be seen from FIG. 1A, the webcam module is thicker than the rest of the bezel 124. The relatively larger thickness of the webcam module provides increased Z height for the optics in the webcam. With this design, the webcam module protrudes from the front of the notebook's thin display bezel 124. However, this protruding webcam module is accommodated, in one embodiment, by a recessed portion/relief 114 in front of the touchpad where the webcam is located when the notebook display is closed. The relief area 114 near the touchpad also provides the benefit of improved touch-feel for the left/right input buttons. That is, it is easier to operate these buttons in a no-look situation. A closer view of the relief area 114 can be seen in FIG. 1B.

Figure 1C:
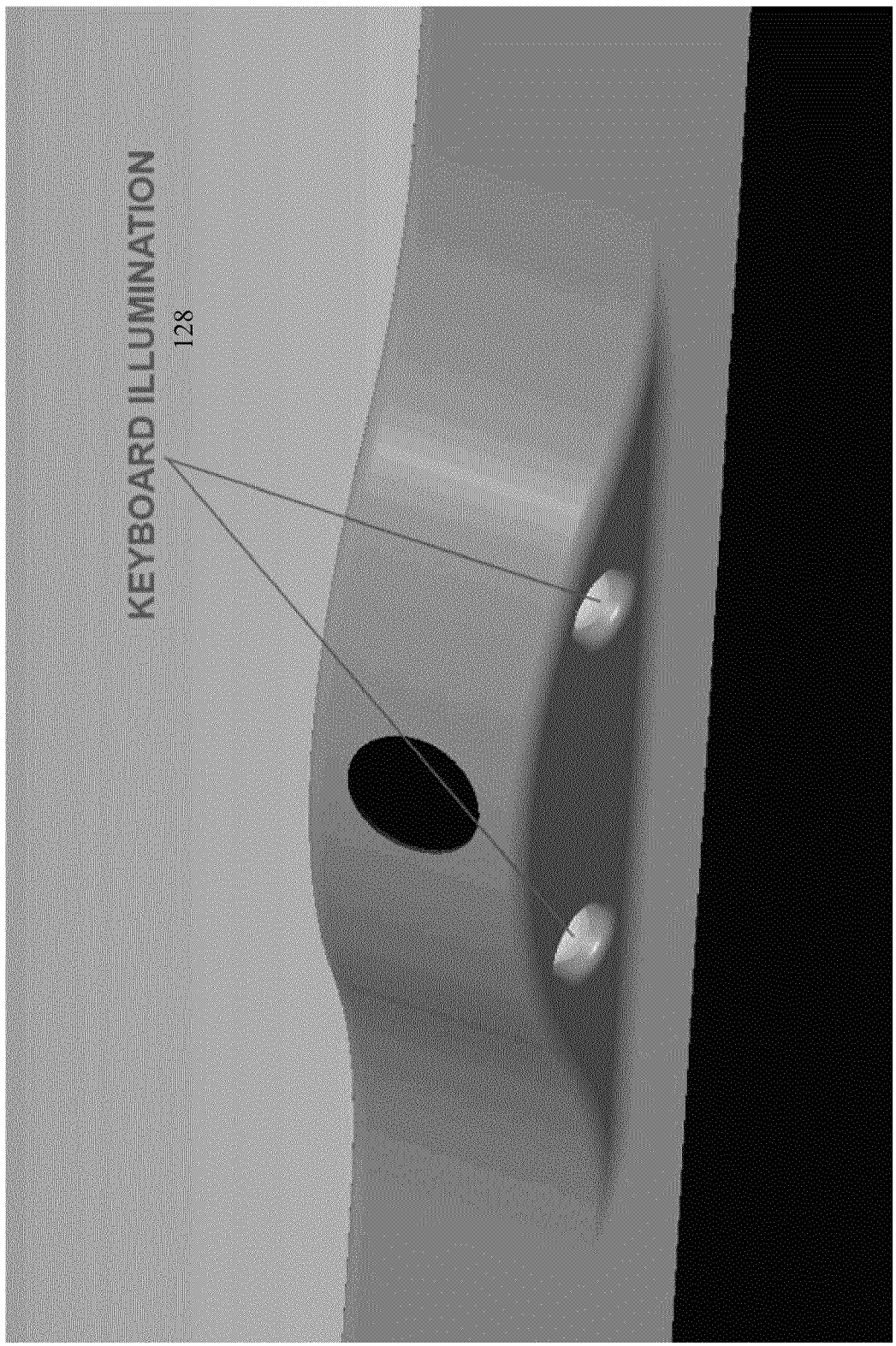
FIG. 1C shows a closer view of the keyboard illumination features on the bottom of the protruding webcam module shown in FIG. 1A.

In one embodiment, two lights (e.g., LEDs) 128, are hidden under the webcam module protrusion provide for keyboard illumination. A closer view of these lights can be seen in FIG. 1C.

Figure 2A:
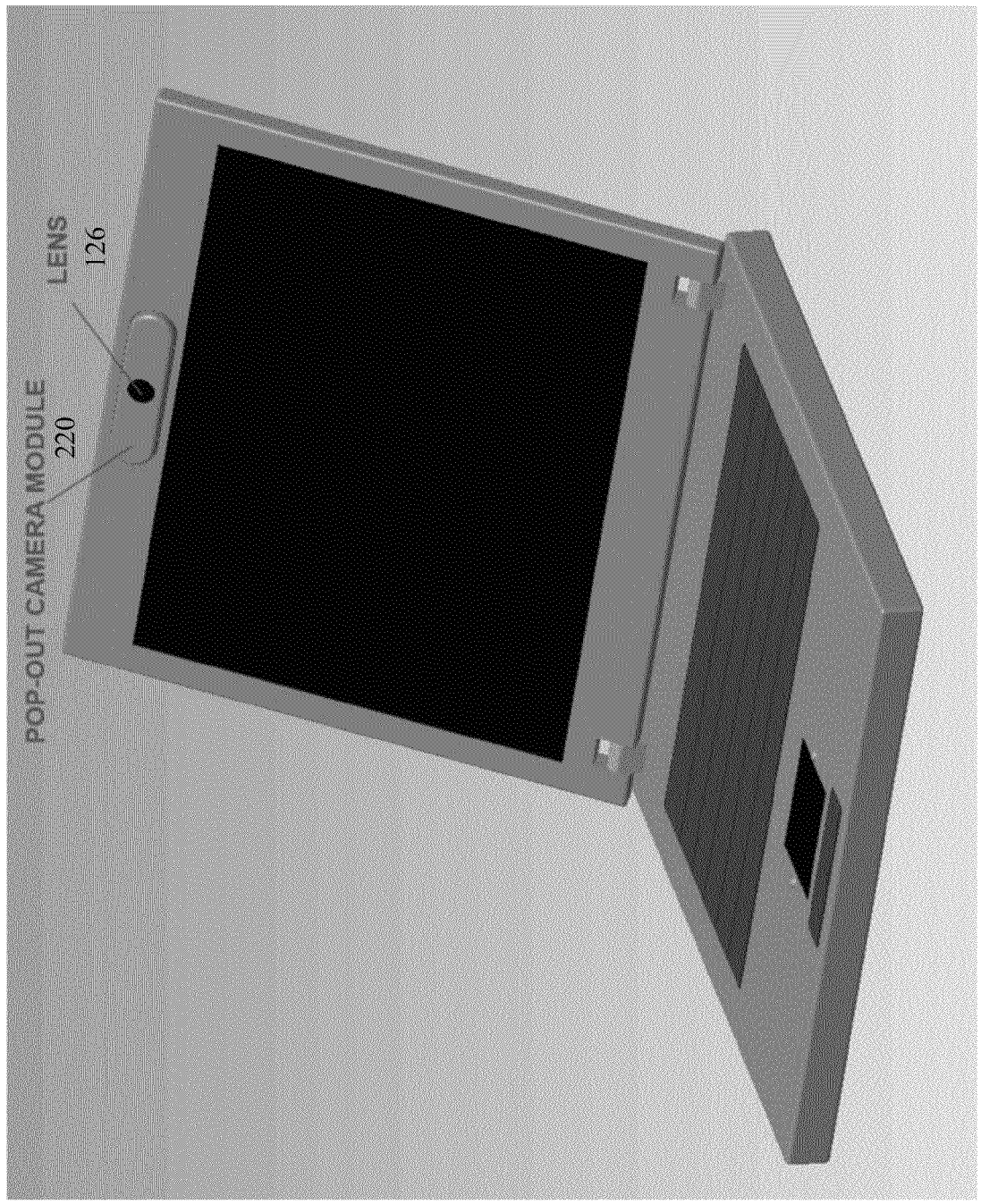
FIG. 2A shows a display bezel of a laptop computer with a pop-out webcam module in accordance with an embodiment of the present invention.

In some embodiments, the increased thickness of the webcam module is only temporary—such as when the webcam is operational. FIG. 2A illustrates one such embodiment of the present invention, which shows a display bezel 124 with a pop-out webcam module 220. In one embodiment, when the webcam 220 is not in use and/or when the laptop case is closed, the webcam 220 is pushed in and thus does not have additional thickness. When the webcam 220 is to be used, it is popped out, and thus provides for a longer optical path.

Figure 2B:
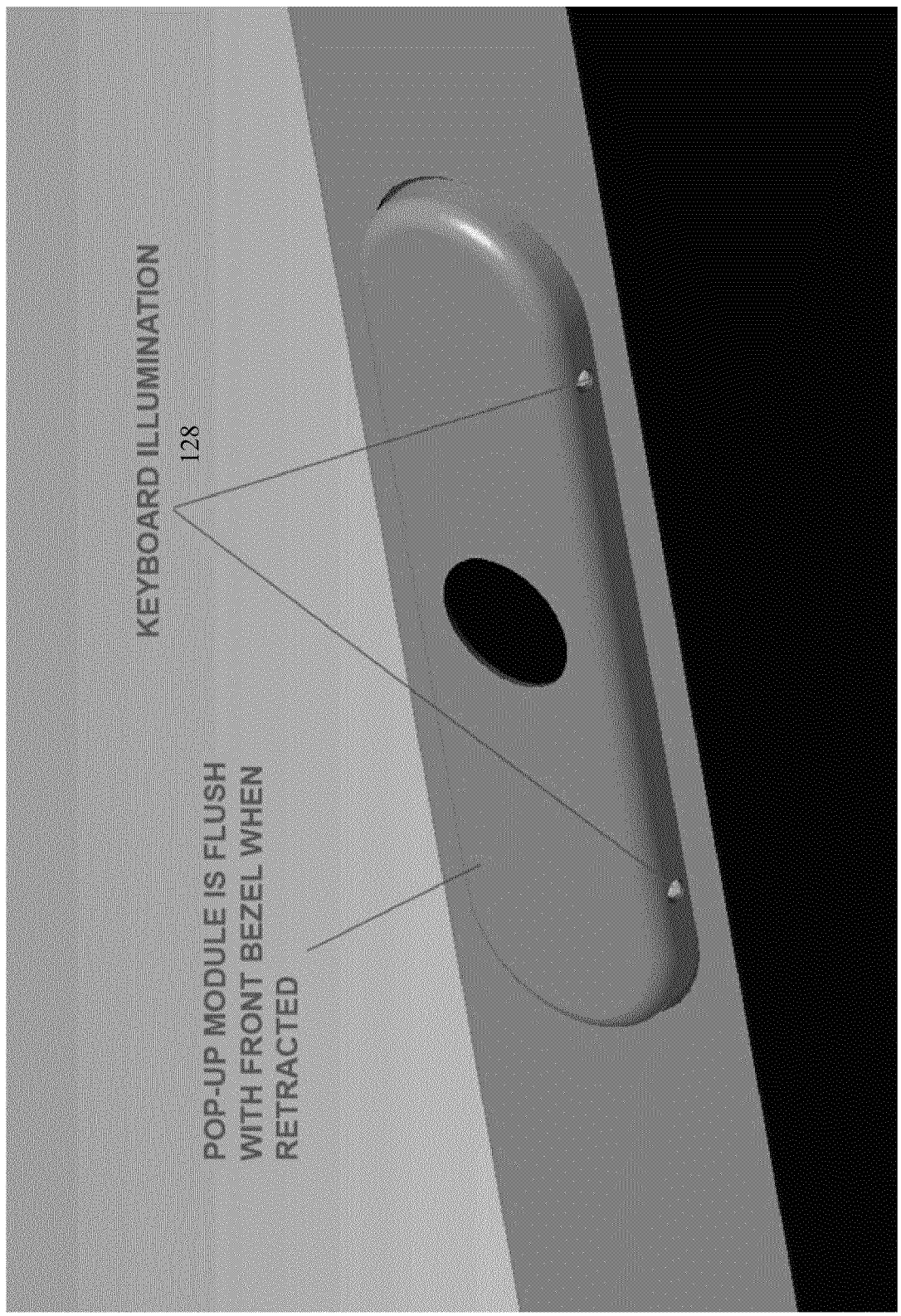
FIG. 2B shows a closer view of the keyboard illumination features on the bottom of the pop-up webcam module shown in FIG. 2A.

In one embodiment, with this design, the webcam optics module is broken into two different sub-assemblies. One sub-assembly is mounted to the display bezel, the other to the pop out module. In one embodiment, the optics path is complete and correct when the webcam is placed in its outermost position—this brings the outermost lens elements into their correct position. In one embodiment, the webcam module 220 is spring loaded with a "push-push" latch mechanism. Pushing on the retracted module will cause it to extend. Once extended, the module is closed by pushing it into the display until the spring is latched into place. In one embodiment, as discussed above, keyboard illumination features 128 are placed on the underside of the webcam module 220. This can be seen in FIG. 2B.

Figure 2C:
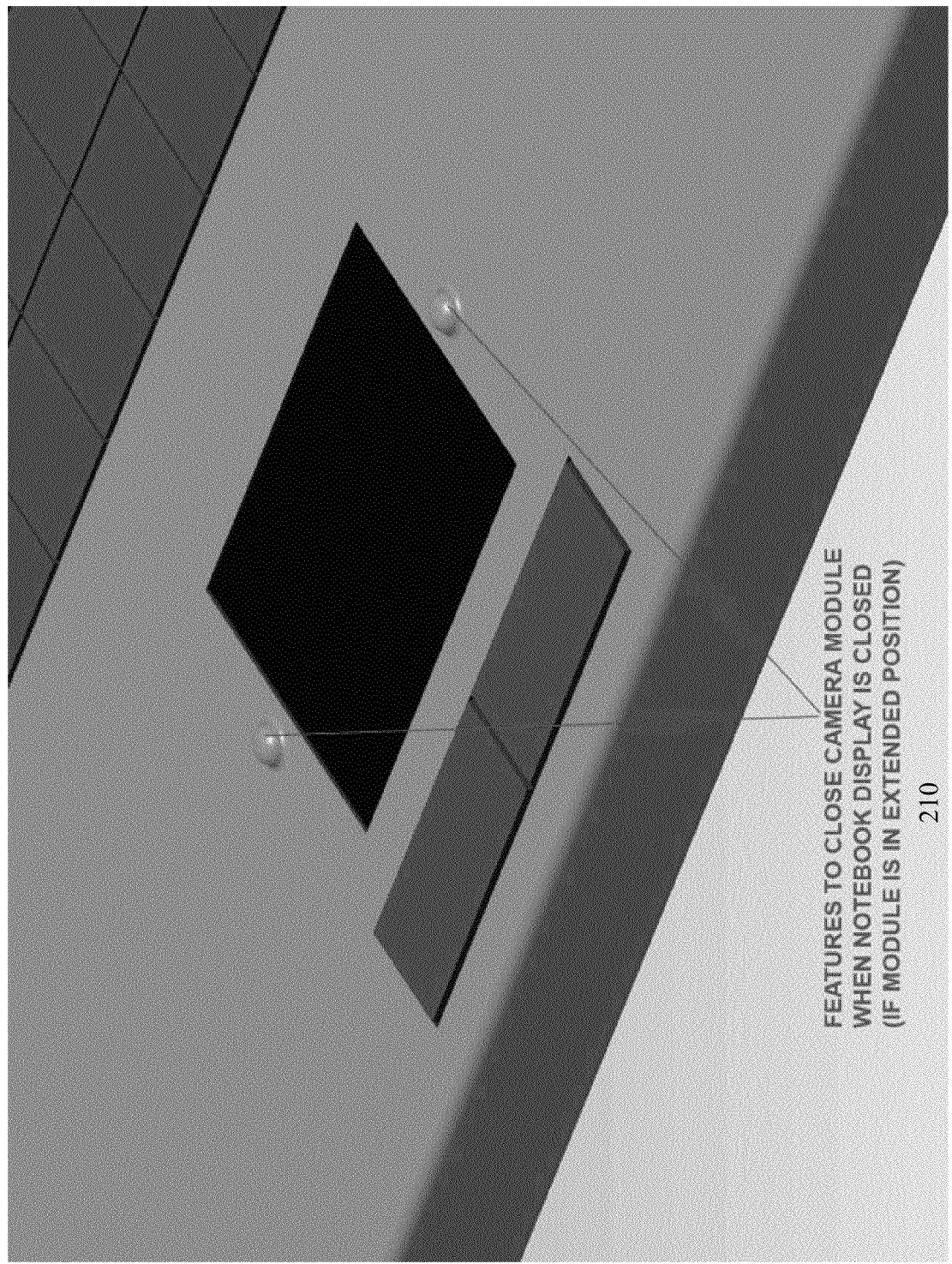
FIG. 2C shows features on the bottom portion of the laptop computer shown in FIG. 2A, which interact with the pop-up webcam module.

In one embodiment, which is shown in FIG. 2C, there are two small bump features 210 on either side of the notebook touchpad. These features push the webcam module 220 into the closed position if the notebook display is closed while the module 220 is extended. In one embodiment, the design of these bumps 210 is such that they make the module 220 partially closed, but not fully latched into the retracted position. As a result, the spring-loaded module will open automatically once the display is opened.

Figure 2D:
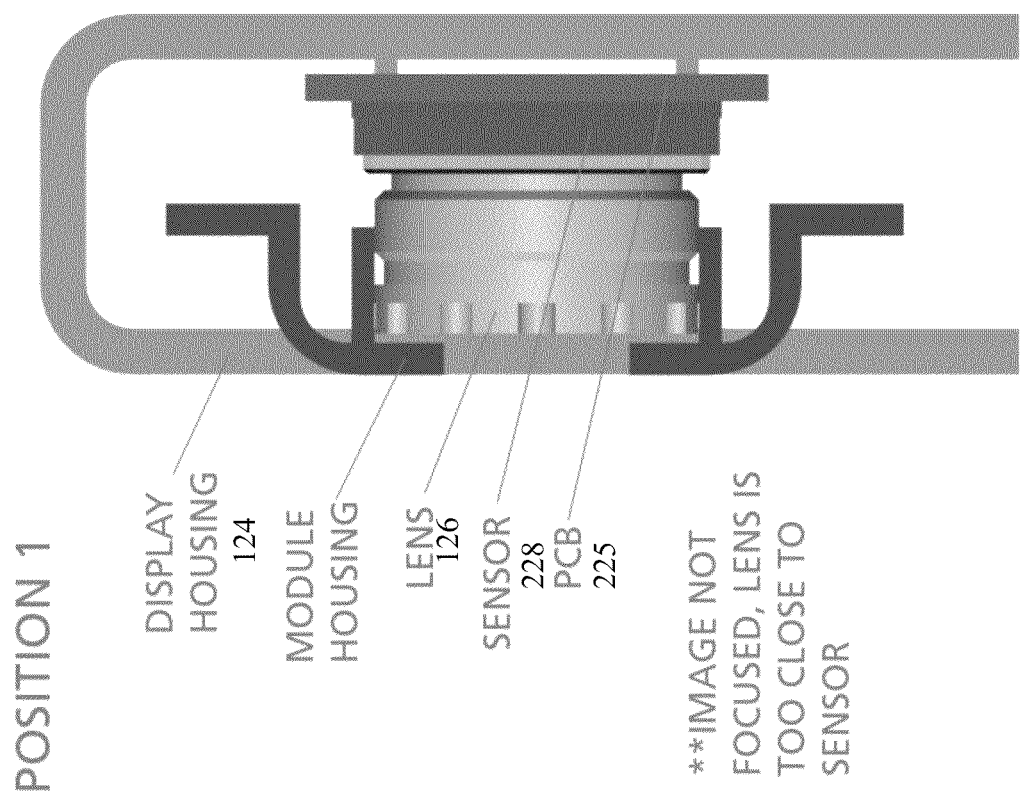
FIG. 2D shows the lens positioned proximate to the sensor in a closed position of the webcam module, in accordance with an embodiment of the present invention.
Figure 2E:
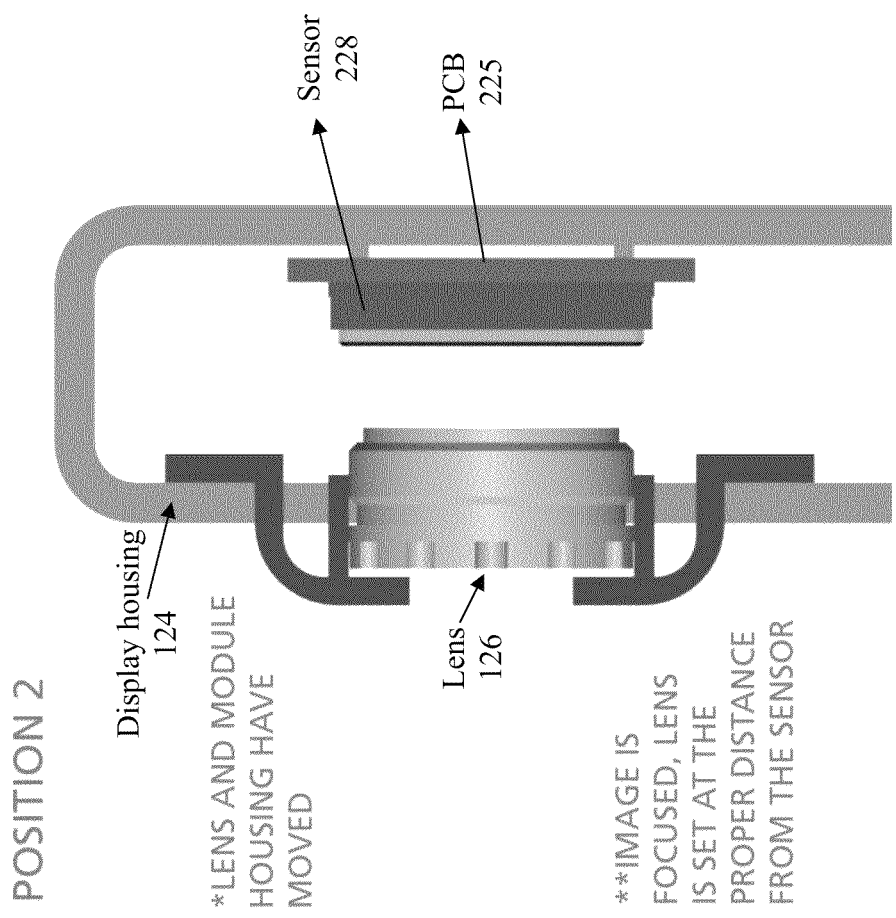
FIG. 2E shows the lens positioned away from the sensor in an open position of the webcam module, in accordance with an embodiment of the present invention.

In one embodiment, a longer optical path is created by increasing the distance between the lens 126 and the sensor 228. A certain distance between lens and sensor (called "back focal length") exists for each webcam module, where the resultant image is properly focused. In the embodiment shown in FIG. 2D, the lens 126 is physically touching (or almost touching) the top of the sensor 228 in the closed position—and the resulting image is out of focus. When the module is popped-out/moved to the second position, the sensor 228 and PCB 225 remain fixed (no movement from the closed position), while the lens 126 moves with the front module housing. This movement of the lens increases the distance between lens 126 and sensor 228 such that the correct back focal length is achieved and the resultant image is in focus. This can be seen in FIGS. 2D and 2E.

Swing-Out Webcam Module with Lens Positioned Along the Long Axis and Potential Connection Via Standard USB Plug As mentioned above, laptop computers and their embedded webcams are designed to be very thin. In conventional embedded webcams, the Z axis for the camera module lens is restricted by the shape and size requirements of the embedding device. The resulting lens assembly is thus restricted to fewer lens elements and also provides less than the ideal amount of light to the image sensor (which may be a CMOS sensor).

In accordance with some embodiments of the present invention, these optical problems are addressed so as to significantly enhance image quality for embedded webcams, by increasing the possible length of the optical path, the number and size of optical elements (e.g., lenses etc.) can be increased, and so on.

Figure 3B:
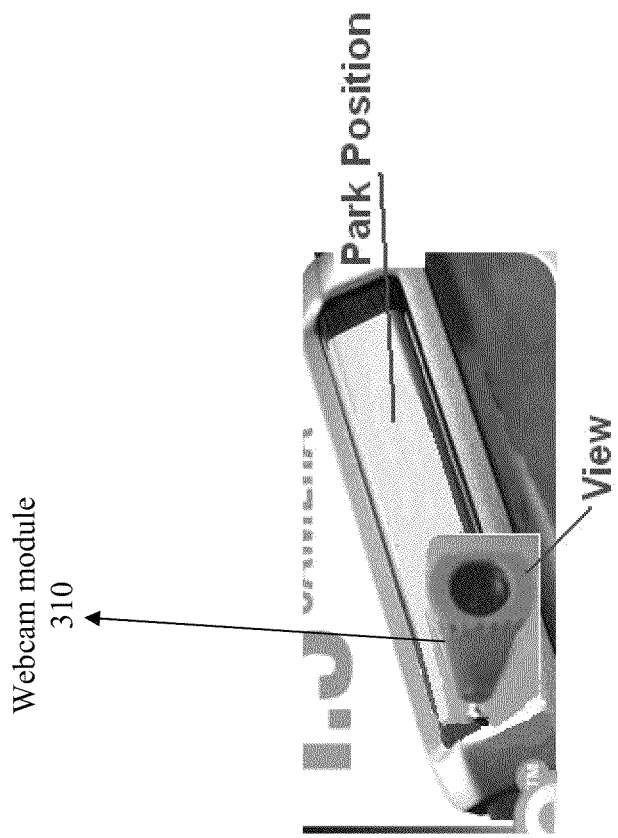
FIG. 3B shows an embedded webcam module in accordance with an embodiment of the present invention, showing both the parked and extended position.
Figure 3A:
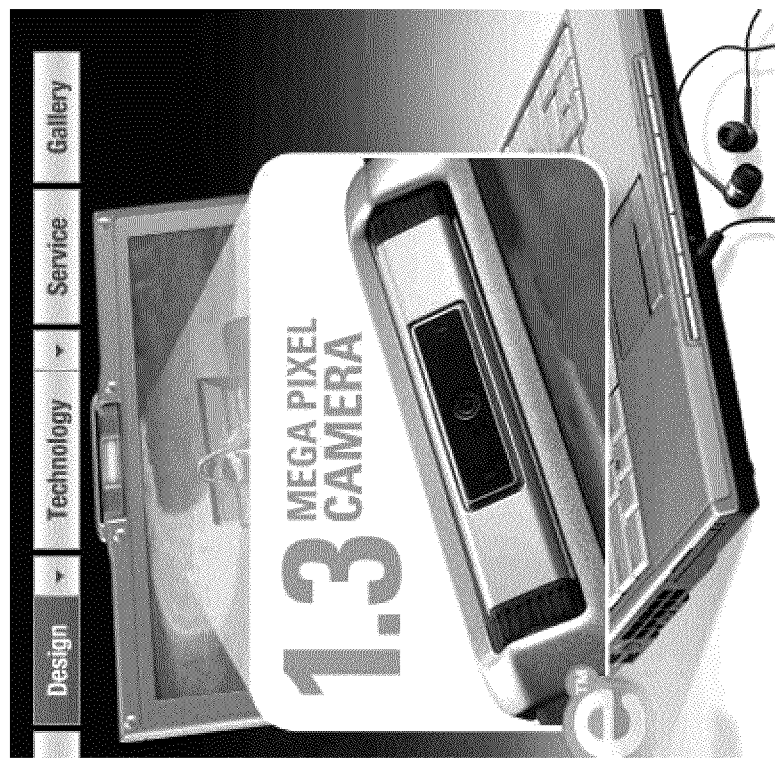
FIG. 3A shows a conventional prior art webcam module.

FIG. 3A shows a conventional embedded webcam module. It can be seen that the z-distance here is limited by the thickness of the display in which the webcam module is embedded. It can be seen in the embodiments shown in FIGS. 3B-3J, that the z-axis length can be significantly longer than in conventional embedded webcams, and thus an optimal z-axis length can easily be implemented. FIG. 3B shows an embedded webcam module in accordance with an embodiment of the present invention, where the webcam module has a park position (when it is not in use) and a view position (when it can be used). It can be seen that a webcam module 310 is embedded in the bezel 124 of the display. As can be seen from FIG. 3B, the park position of the webcam module 310 is when it is flush with the bezel 124, while the view position is when the webcam 310 is pulled out from the plane of the display. In one embodiment, the view position is when the webcam module 310 is pulled out to a position approximately perpendicular to the plane of bezel 124.

Figure 3C:
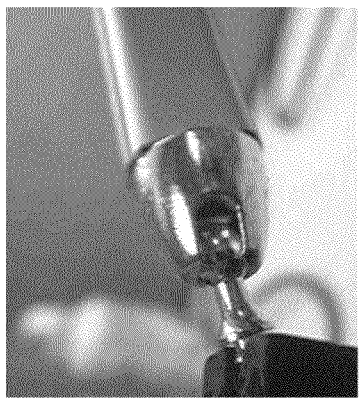
FIG. 3C shows a first view of an attachment mechanism for attaching a webcam module to a display in which it is embedded in accordance with an embodiment of the present invention.
Figure 3D:
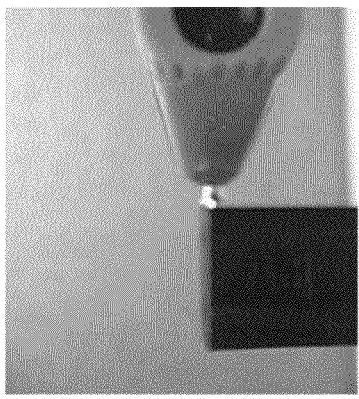
FIG. 3D shows a second view of an attachment mechanism for attaching a webcam module to a display in which it is embedded in accordance with an embodiment of the present invention.
Figure 3E:
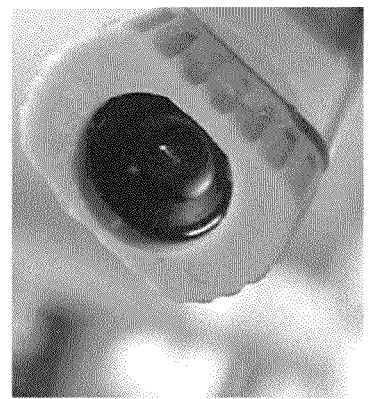
FIG. 3E shows a third view of an attachment mechanism for attaching a webcam module to a display in which it is embedded in accordance with an embodiment of the present invention.
Figure 3F:
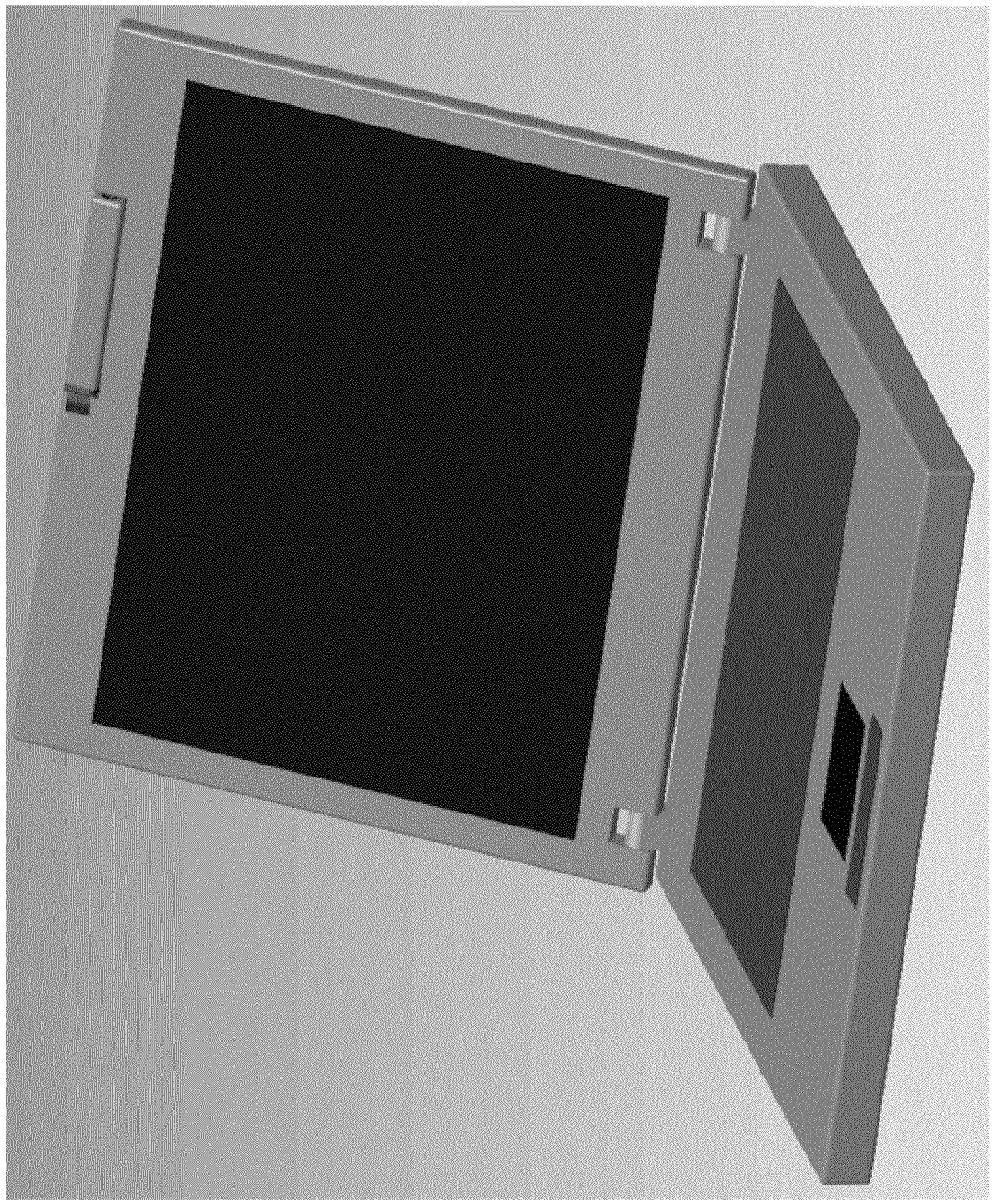
FIG. 3F shows an example of an attachment mechanism for attaching a webcam module to a display in which it is embedded in accordance with an embodiment of the present invention.

FIGS. 3C-3E further show an example of one way in which the embodiments shown in FIGS. 3A and 3B can be implemented. In one embodiment, a swivel joint 312 is used to attach the webcam module 310 to the bezel 124. The webcam 310 can be used at several viewing angles in such an embodiment. In one embodiment, a ball joint is used to attached the webcam module to the bezel 124.

Figure 3G:
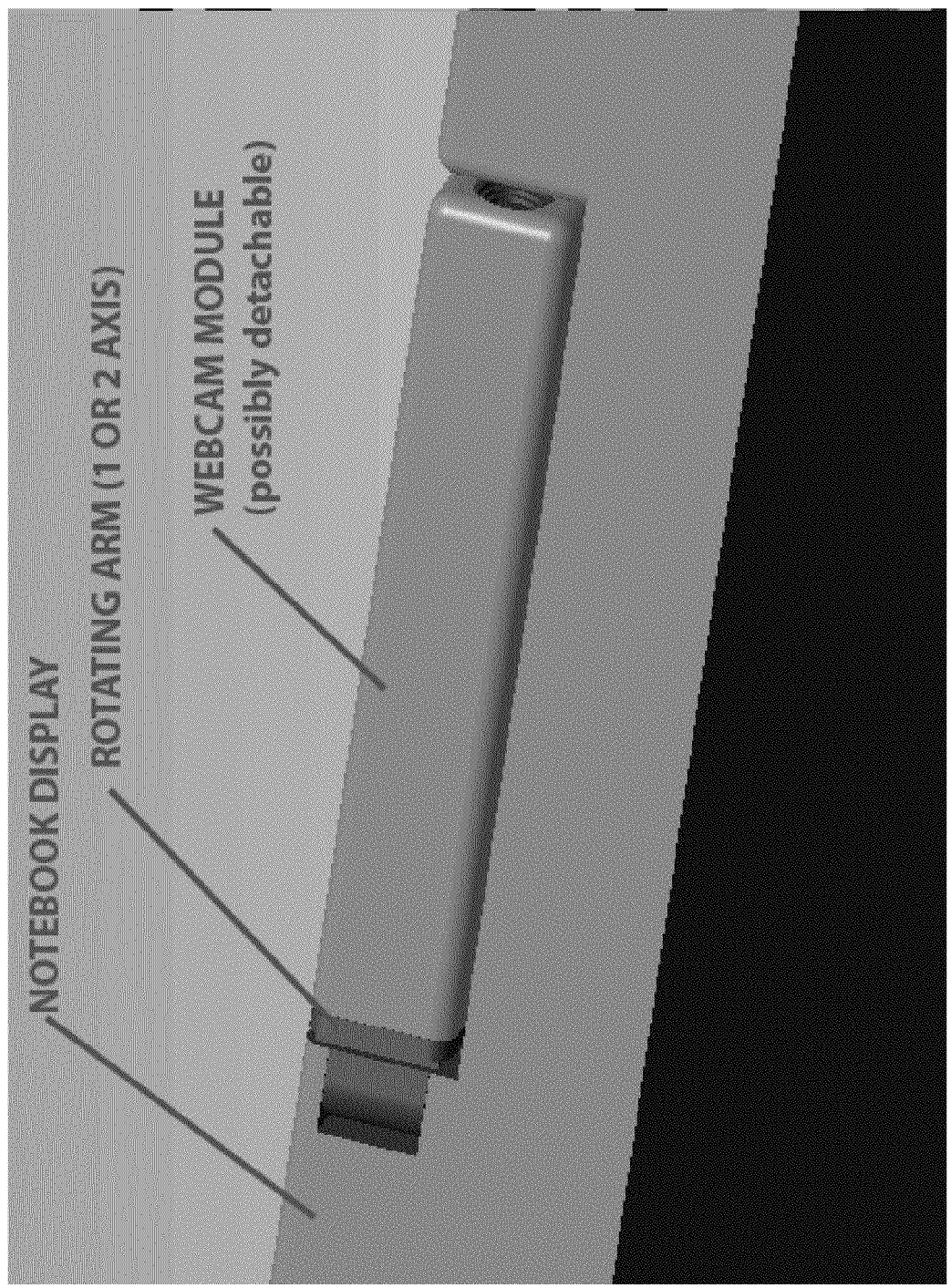
FIG. 3G shows a rotatable and/or detachable webcam module embedded in a display in accordance with an embodiment of the present invention.
Figure 3H:
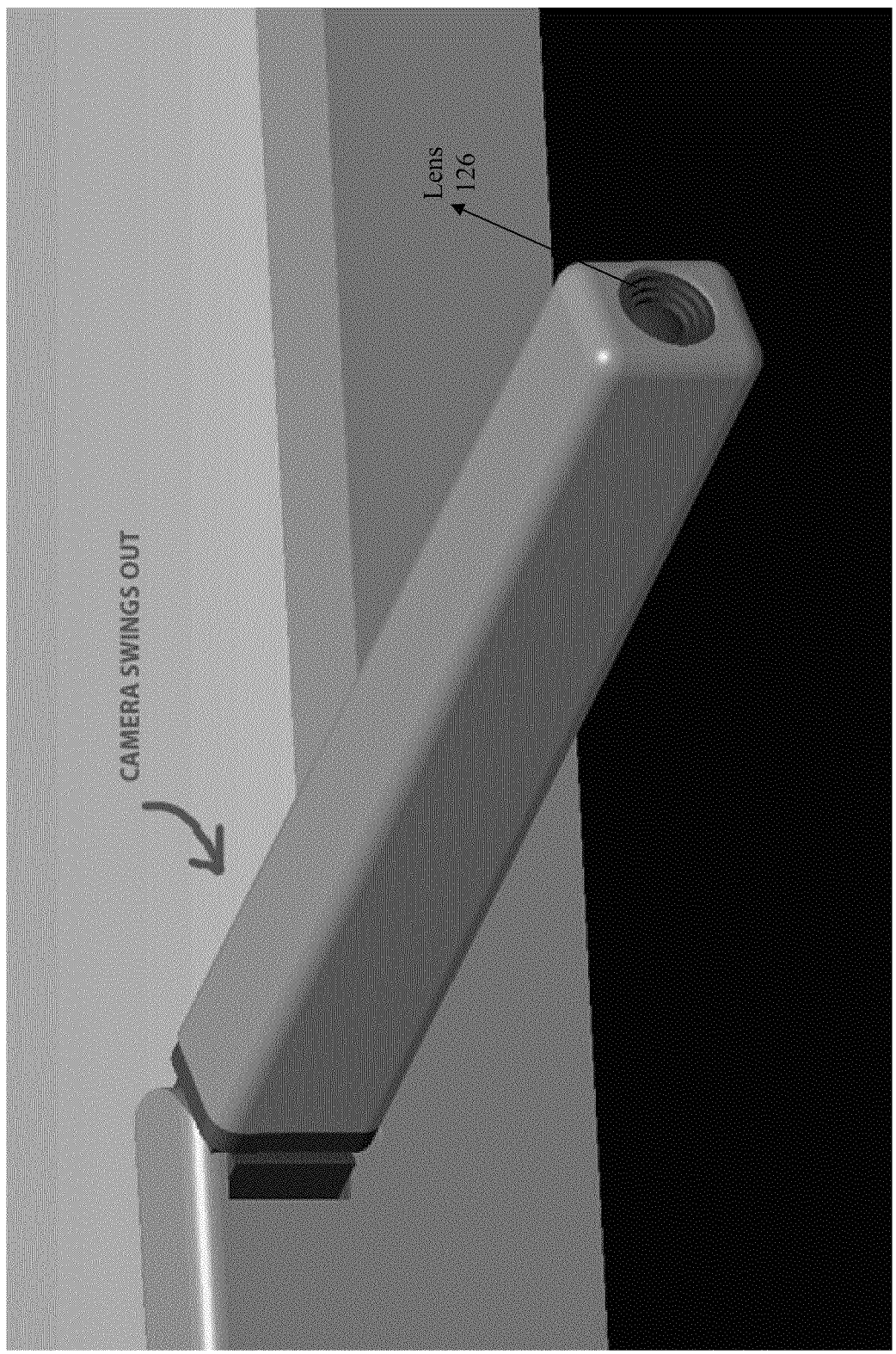
FIG. 3H shows the webcam module in FIG. 3G swinging out of the plane of the display, in accordance with an embodiment of the present invention.

FIGS. 3F-3J show other examples of ways in which the embodiments shown in FIGS. 3A and 3B can be implemented. It is to be noted that several other types of joints/connections could also be used. In many of these embodiments, the webcam module is detachable, as can be seen in FIG. 3G. In such embodiments, the webcam module can be replaced by another webcam module, thus allowing replacement/upgrade to the module. In one embodiment, the webcam module is replaced by another module altogether (for instance, a module with a speaker and/or microphone, a module with lights, etc.). Such detachable modules are described in greater detail in co-pending application Ser. No. 11/478,898, filed on Jun. 30, 2006, entitled "Computer Monitor with Detachable Module", which is owned by the assignee of the present invention.

It can be seen from several of these figures (e.g., FIG. 3H) that in one embodiment, the lens 126 is at one end of the webcam module 310. Thus the lens 126 is protected when in the park position. Additionally, such an embedded webcam is secure for shipment. Also, when in the park position, a privacy shade is automatically implemented—image data is not captured and/or transmitted when the webcam 310 is in a park position.

Figure 3I:
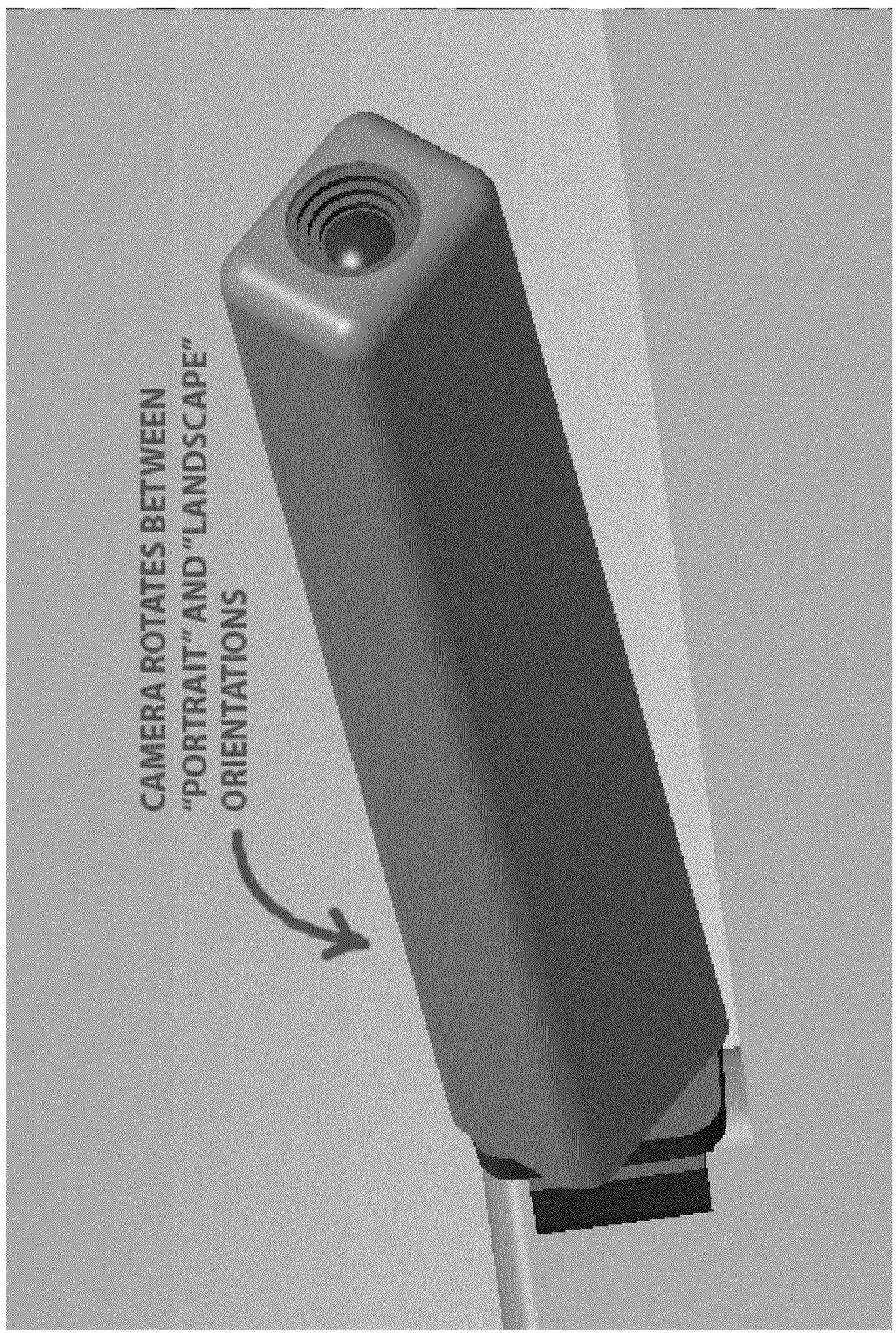
FIG. 3I is another view of the rotation of the webcam module in FIG. 3G.

FIG. 3I shows that in one embodiment, the camera 310 can be rotated to switch lens orientations—for example, between portrait and landscape. In one embodiment, other orientations (e.g., diagonal) are also implemented. In one embodiment, such a rotation could be manual. In one embodiment, such a rotation could be automatic (e.g., based upon the image data being captured).

Figure 3J:
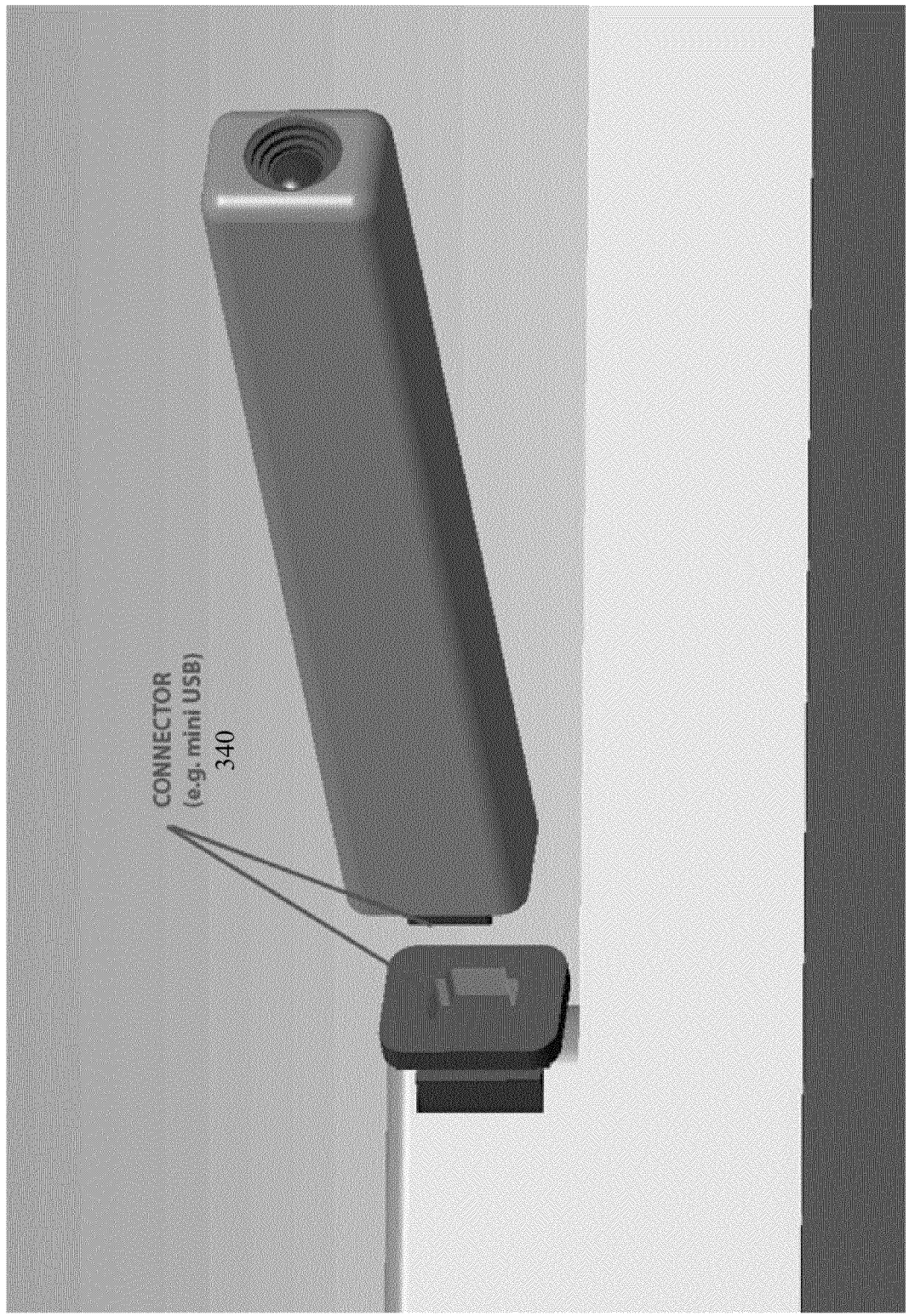
FIG. 3J shows an electrical connection between a webcam module and a display in which it is embedded, in accordance with an embodiment of the present invention.

FIG. 3J shows that in one embodiment, the camera module 310 attaches to the rotating arm via a connector 340. It can be seen that in one embodiment, an electrical connector is combined with/is part of the mechanical connector. For instance, a mini-USB cable is part of connector 340. It is to be noted that the mechanical and/or electrical connectors are not limited to the ones described above, but that the examples above are merely illustrative.

Figure 4D:
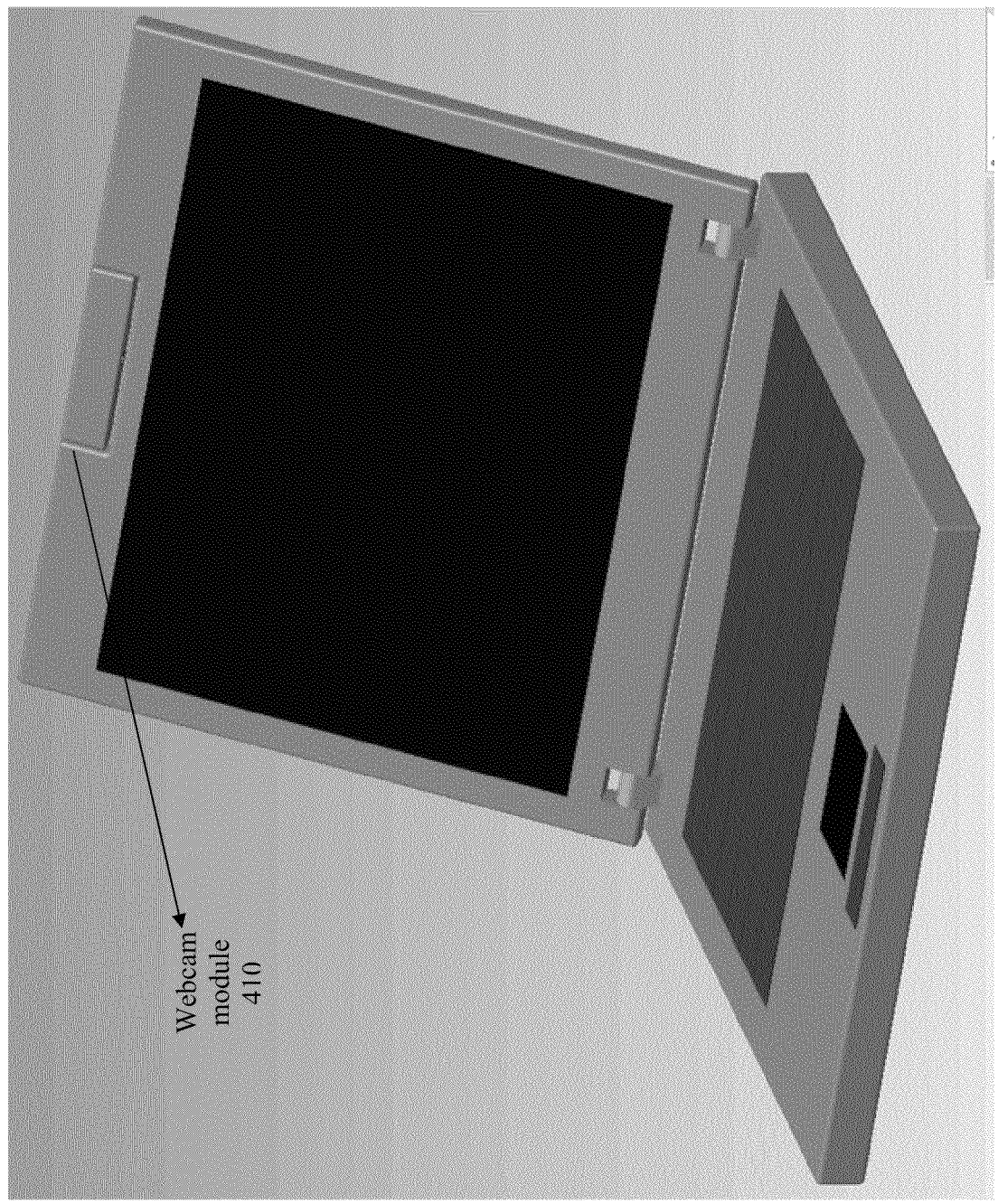
FIG. 4D shows a webcam module with an elongated shape in a closed position, in accordance with an embodiment of the present invention.
Figure 4E:
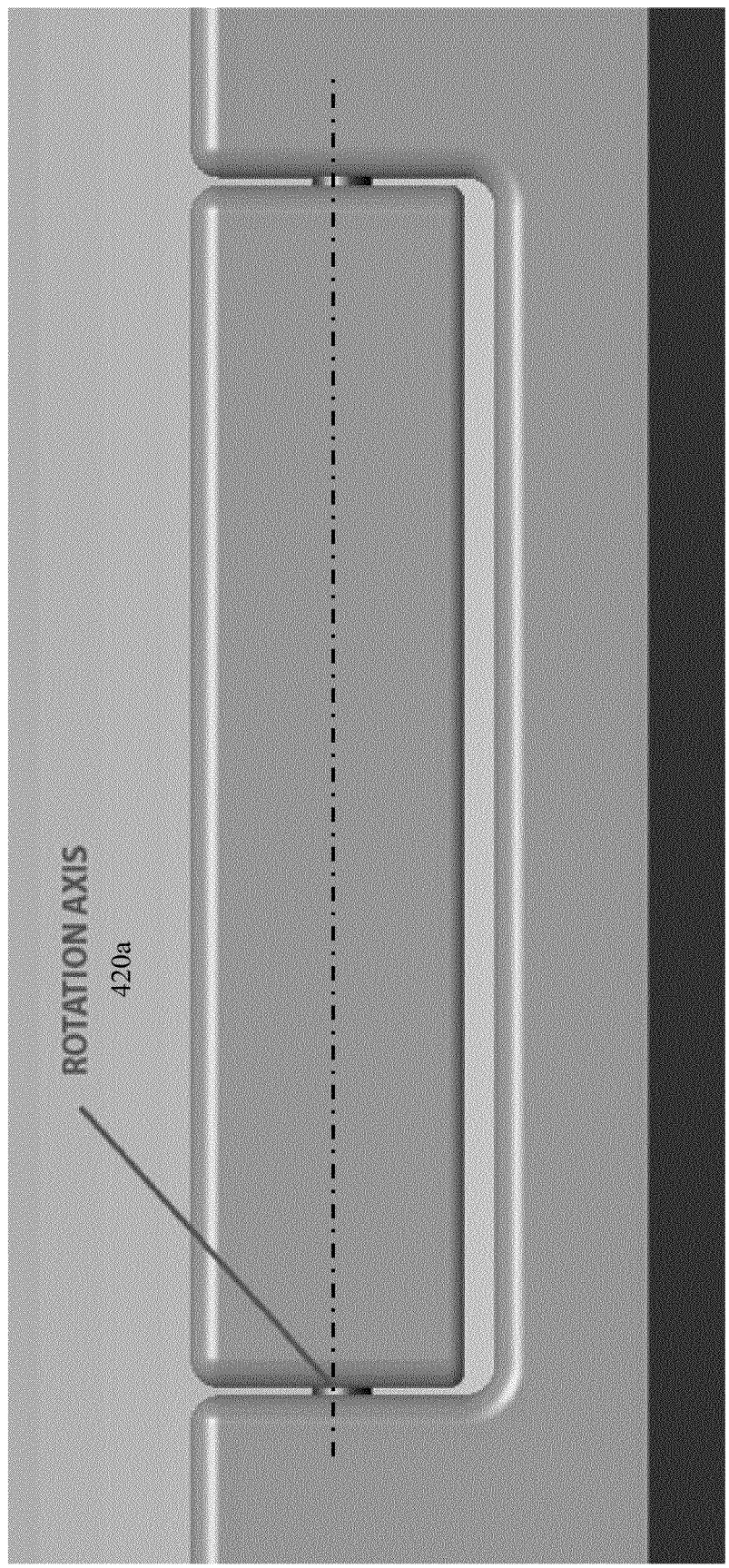
FIG. 4E illustrates an embodiment in accordance with the present invention where the rotation axis for the webcam module is vertically centered on the webcam module.
Figure 4F:
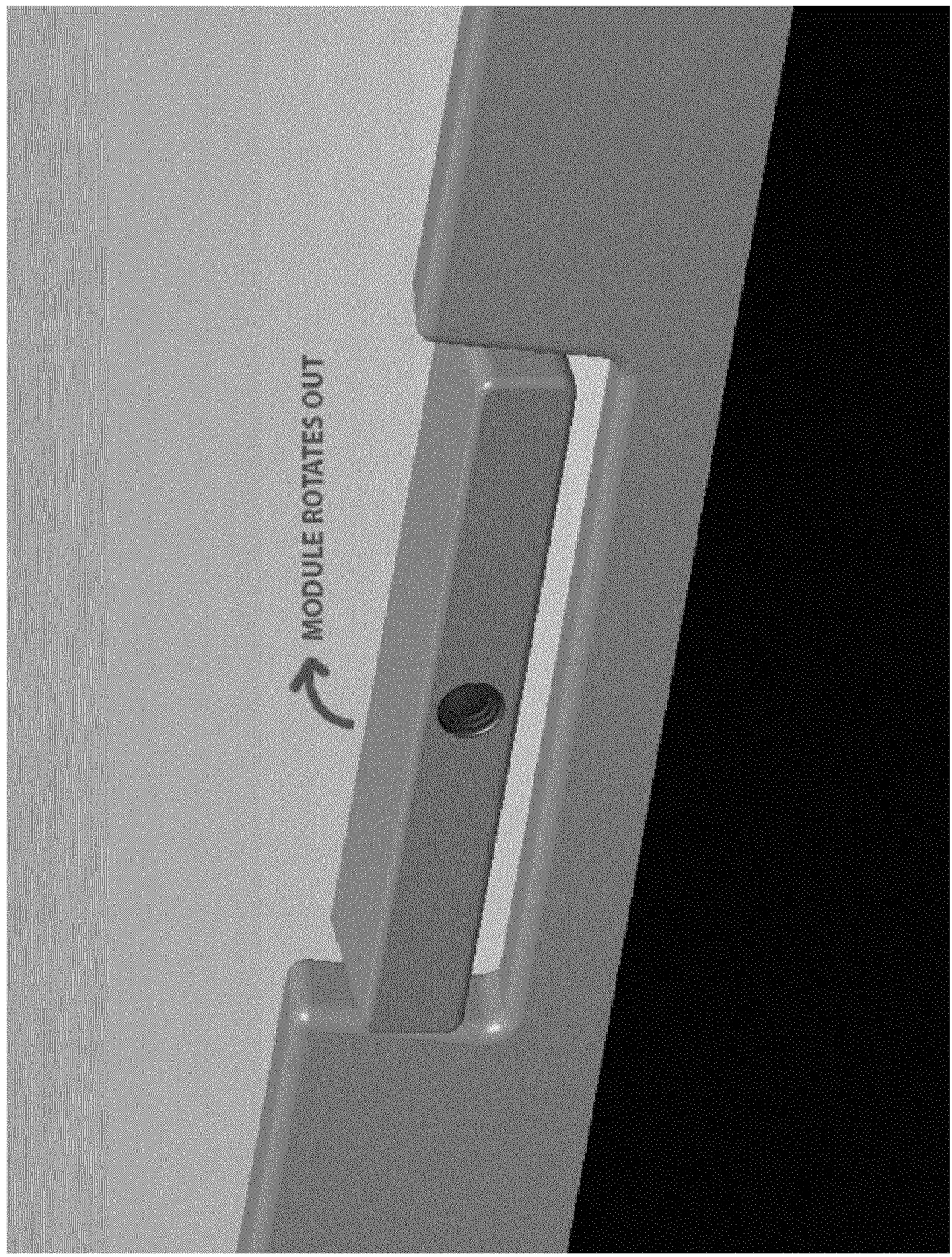
FIG. 4F shows a front view of a webcam module shown in FIG. 4E, rotated out so that the webcam can be used.
Figure 4G:
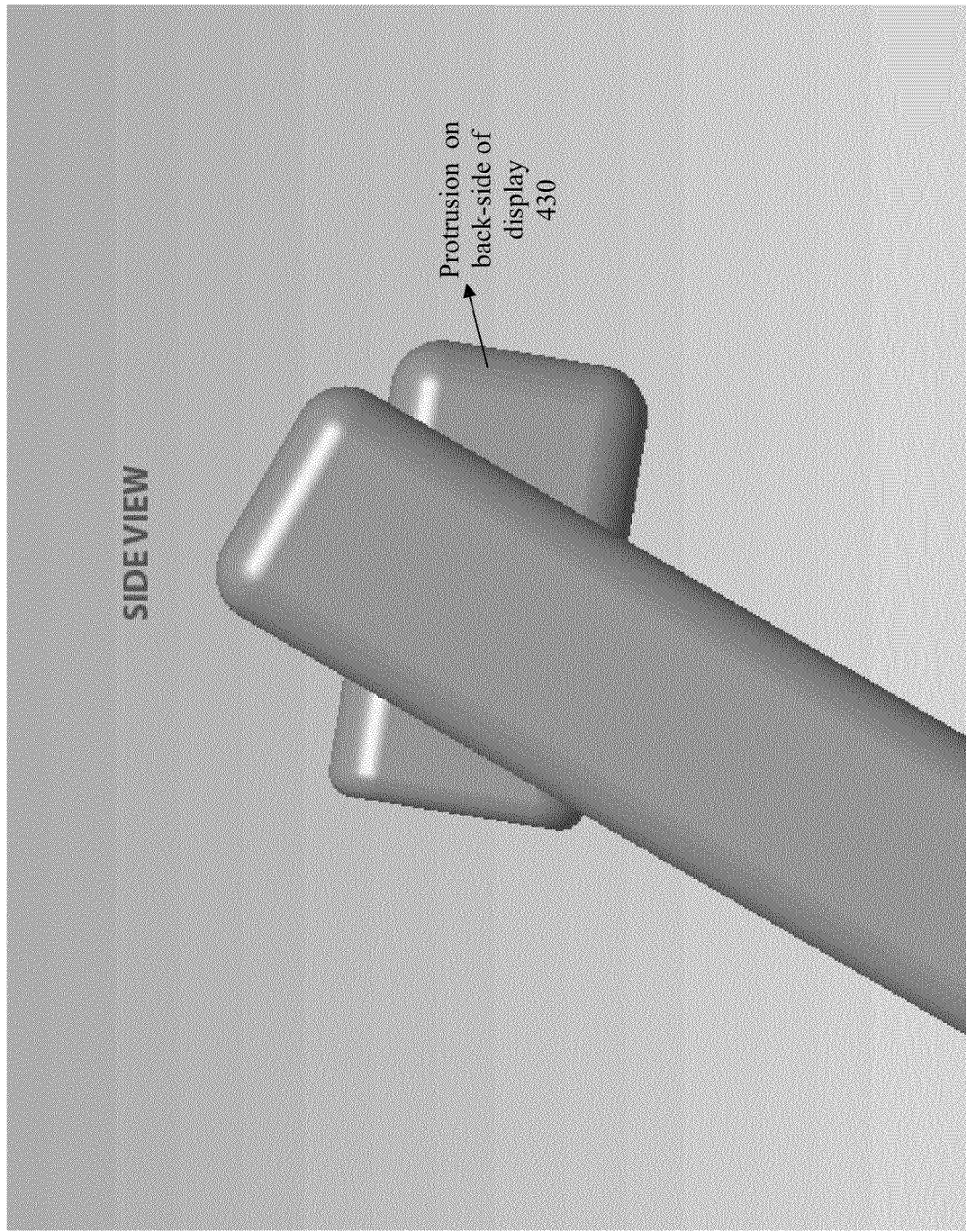
FIG. 4G shows a side view of the display with the webcam module shown in FIG. 4F.
Figure 4H:
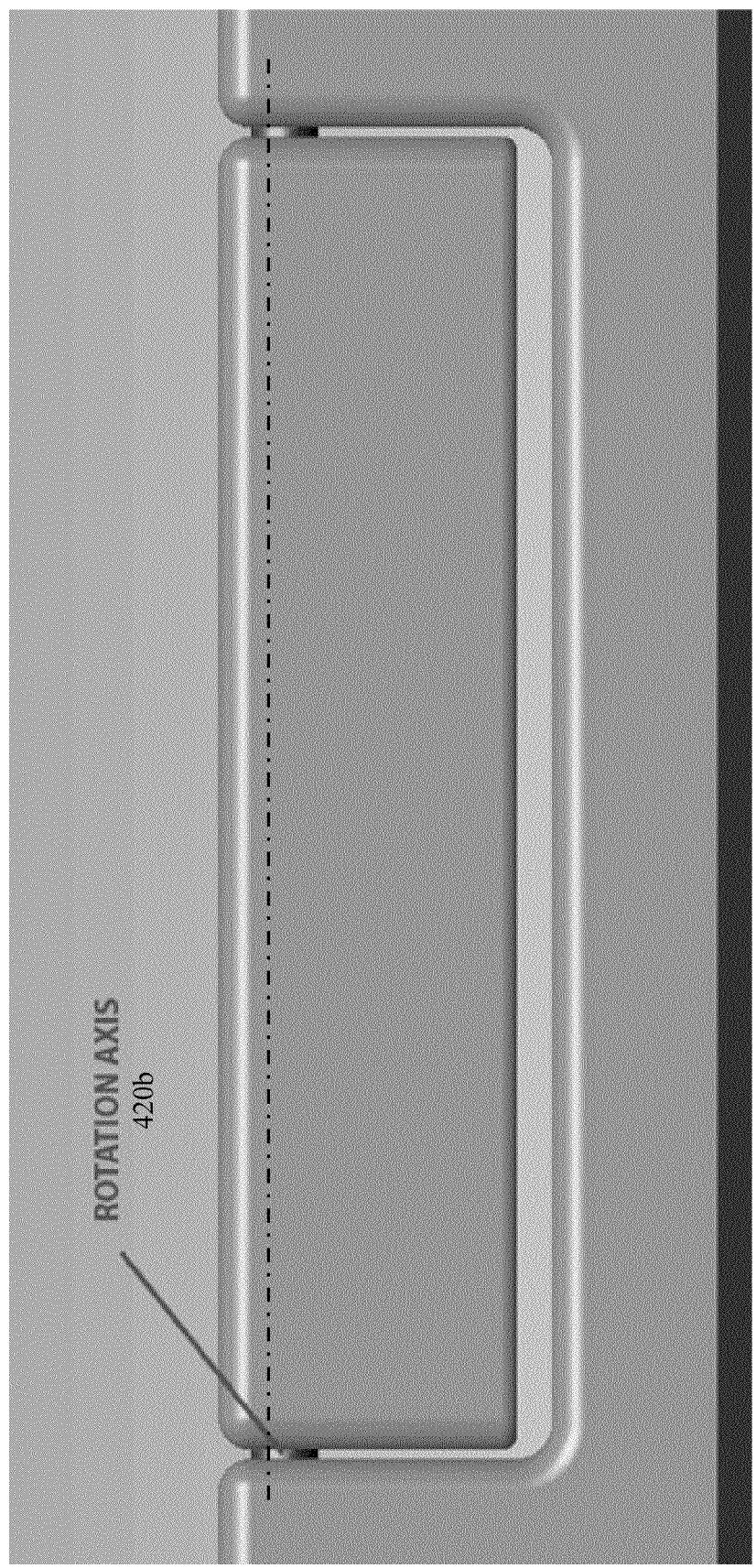
FIG. 4H shows an embodiment in accordance with the present invention where the rotation axis for the webcam module is not vertically centered on the webcam module.
Figure 4I:
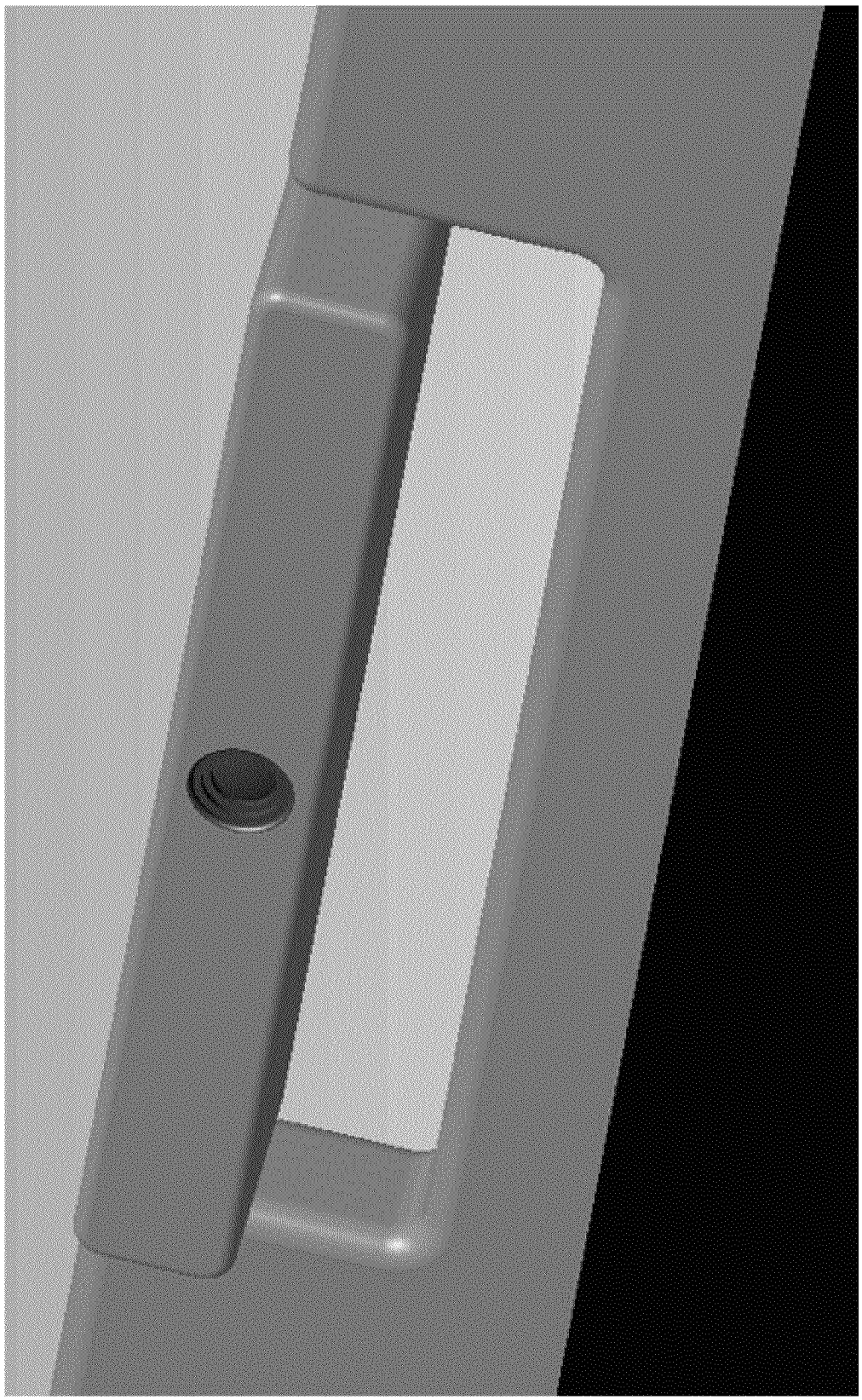
FIG. 4I shows a front view of a webcam module shown in FIG. 4H, rotated out so that the webcam can be used.
Figure 4J:
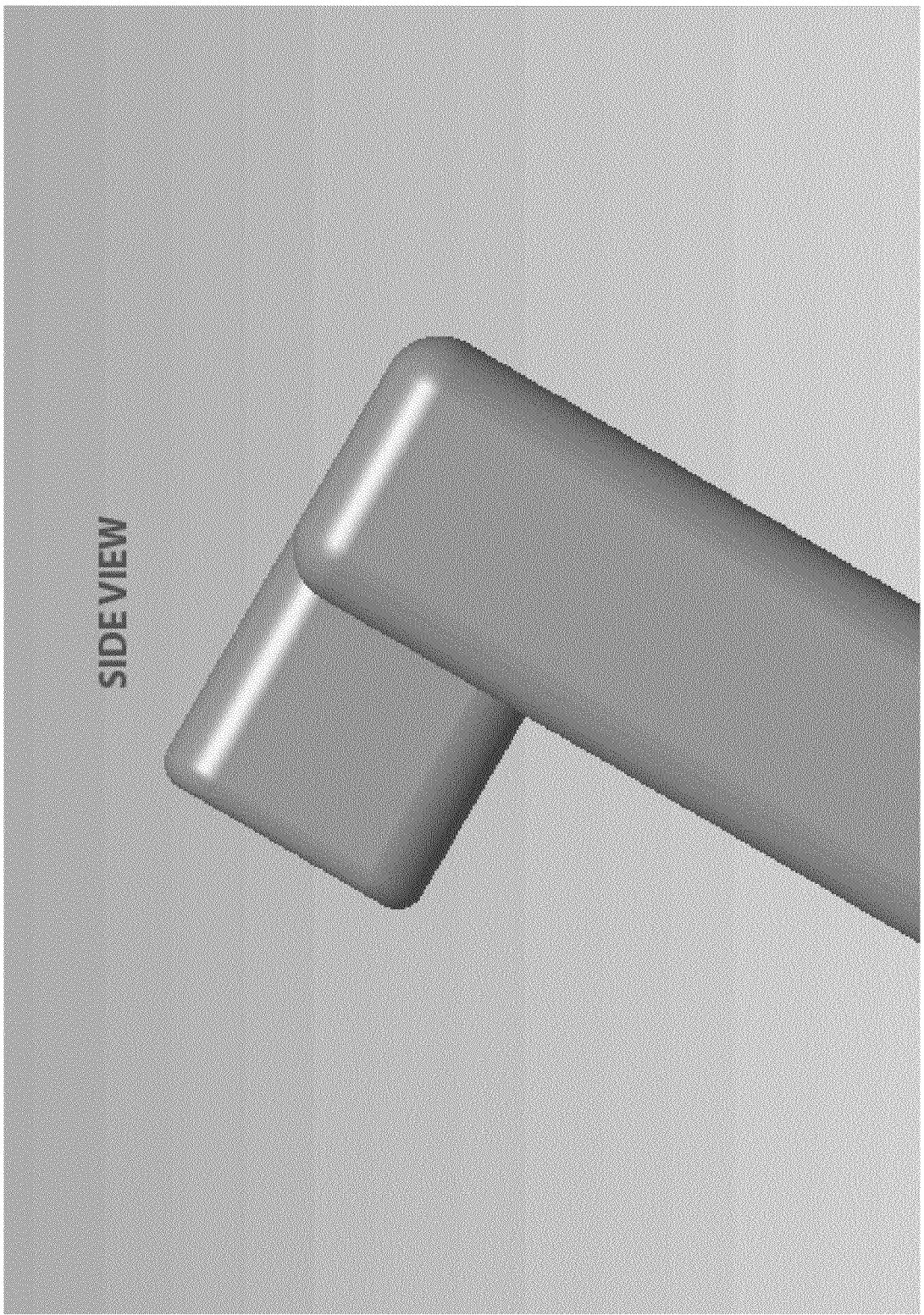
FIG. 4J shows a side view of the display with the webcam module shown in FIG. 4I.
Figure 5A:
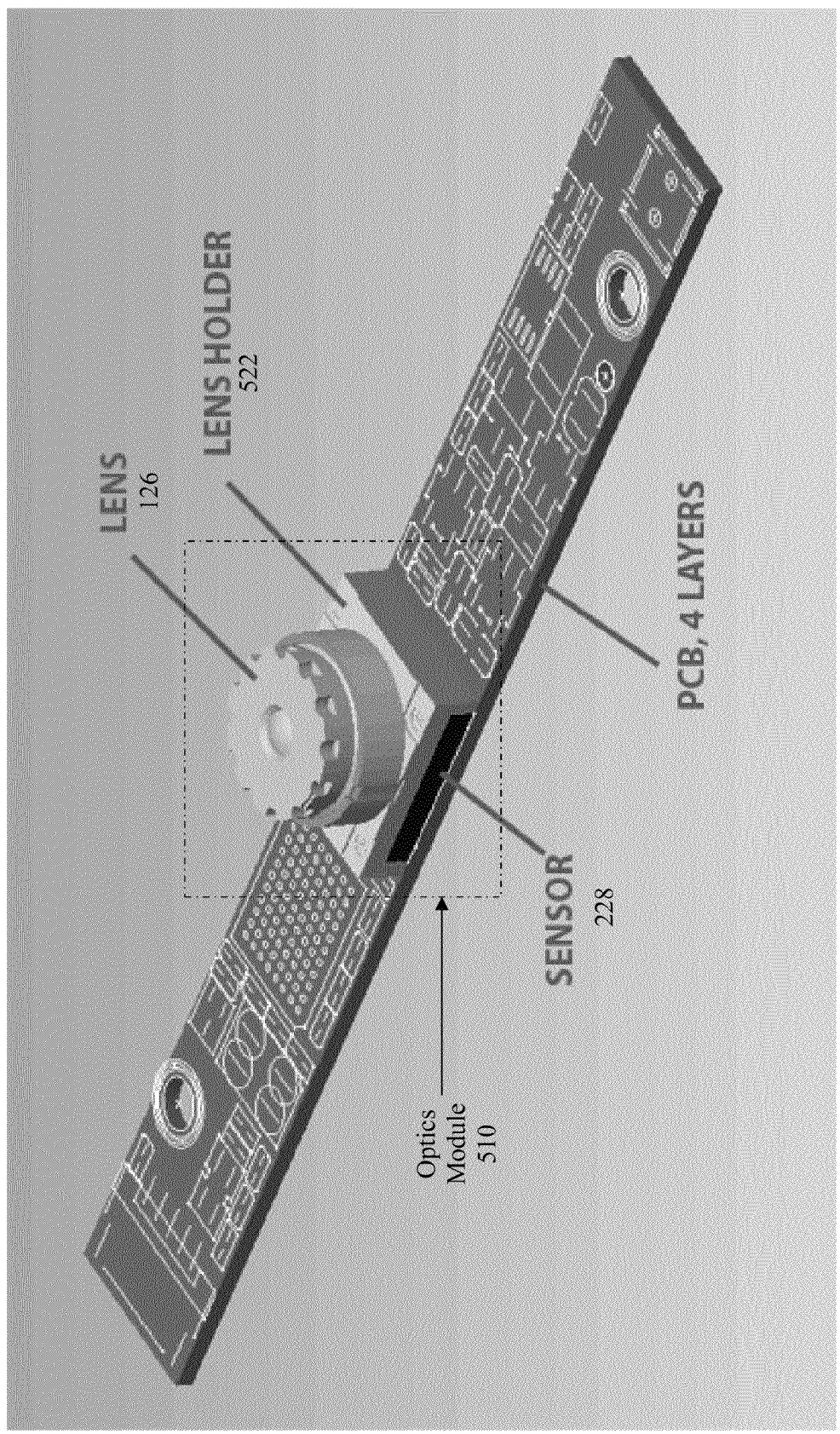
FIG. 5A illustrates a conventional multi-layered PCB used in a webcam module.

Rotating Webcam Module with Oblong Shape that Provides Thin Profile when Closed, Increased Z Height when Open As shown in FIGS. 4A and 4B, the camera 410 may be substantially flush with the display in the off position (FIG. 4), and ends of the camera 410 may extend from the front or back of the display in the working position (FIG. 5A). As discussed further below, the axis of rotation of the camera may be adjusted such that only one end of the camera extends from the front or back of the display, e.g. see FIG. 4J.

FIG. 4D shows a webcam 410 with an elongated shape—the module 410 here is in the closed position. FIG. 4E illustrates an embodiment where the rotation axis 420*a* for the webcam module 410 is vertically centered on the module 410. FIG. 4F shows a front view of the module 410 rotated out so that the webcam can be used—the lens 126 is on the bottom surface of the camera module 410 when it is in the closed position. Such a placement of the lens 126 protects the lens when the camera module 410 is in the closed position. However, it is to be noted that the lens 126 can be placed elsewhere in accordance with embodiments of the present invention (e.g., at the top surface of the module 410). FIG. 4G shows a side view of the display with the module 410 rotated out. It can be seen that there is a protrusion on the backside of the display in which the webcam 410 is embedded, because the rotation axis is centered on the module 410.

FIG. 4H shows an embodiment where the rotation axis 420*b* is not centered on the webcam module 410. Instead, the rotation axis 420*b* for the webcam module 410 is located higher than the center, so that the module 410 does not protrude from the rear of the display when rotated, as can be seen in FIG. 4J. FIG. 4I shows a front view of the module 410 rotated out so that the webcam can be used—the lens 126 is on the bottom surface of the module 410 when it is in the closed position. In one embodiment, the rotation is located lower than the center, such that the open module does not protrude from the front of the display. In this embodiment, the notebook display may be closed without having to rotate the webcam module to the closed position.

In various embodiments it is possible for the webcam module to rotate both clockwise and counterclockwise—allowing the lens to point to the front or rear of the notebook display.

Figure 5B:
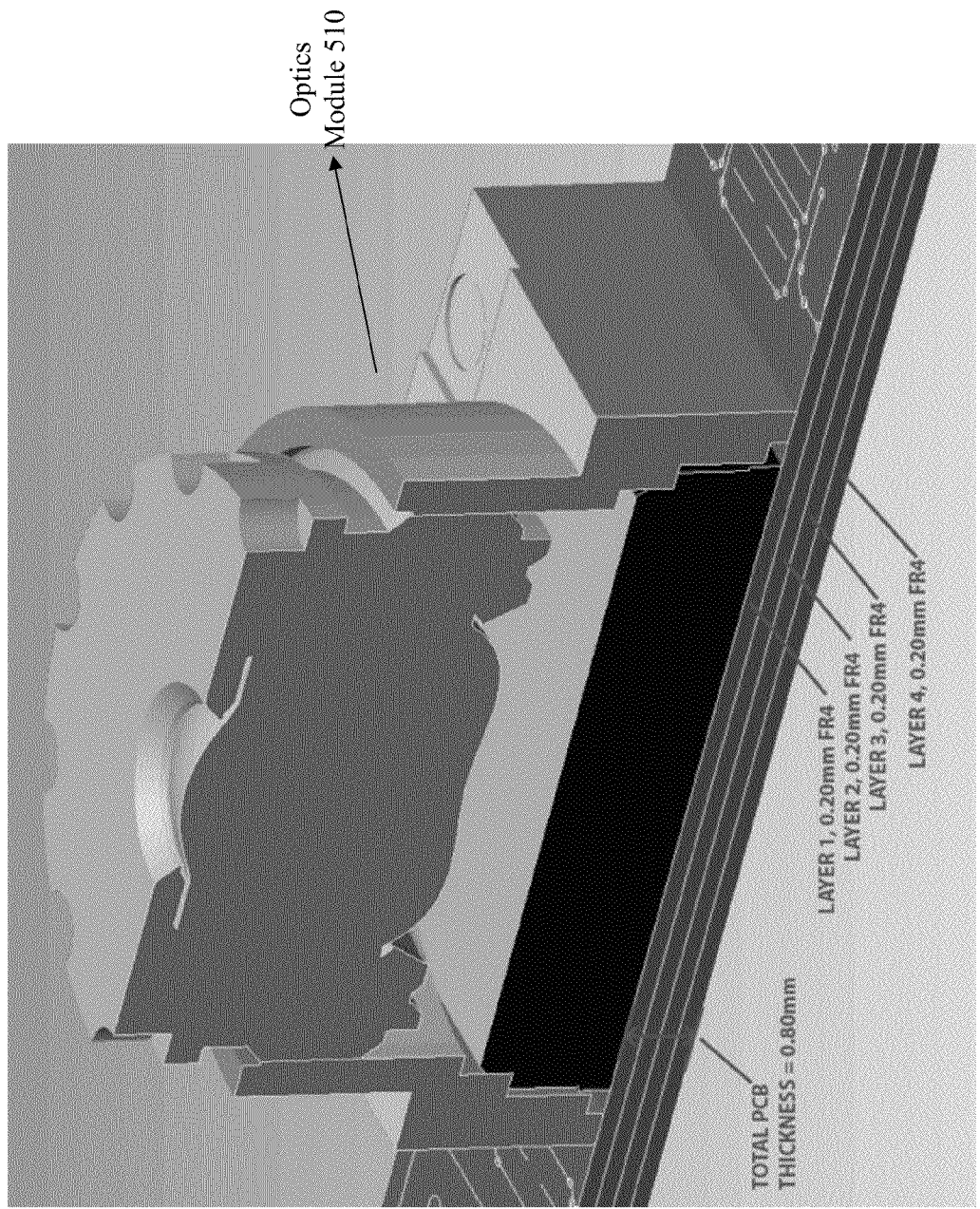
FIG. 5B is a closer view of the PCB shown in FIG. 5A.

Webcam Module on Stepped PCB Substrate—Thick PCB Area Used for SMT Assembly, Thin Area Used for Sensor/Optics In conventional PCB fabrication, uniform layers of substrate material are laminated together to form a multi-layer printed circuit board. An example of a webcam module with a conventional 4 layer PCB is shown in FIG. 5A. In this example, the board is a laminate of 4 layers of PCB material, each layer being 0.2 mm thick. A cross section of this module is shown in FIG. 5B. If the thickness of the PCB is too small, the structural rigidity of the webcam module is compromised. However, having a thick PCB under the optics module leads to increased thickness of the webcam module, which is often undesirable and/or unacceptable for thinner and sleeker displays.

Figure 5C:
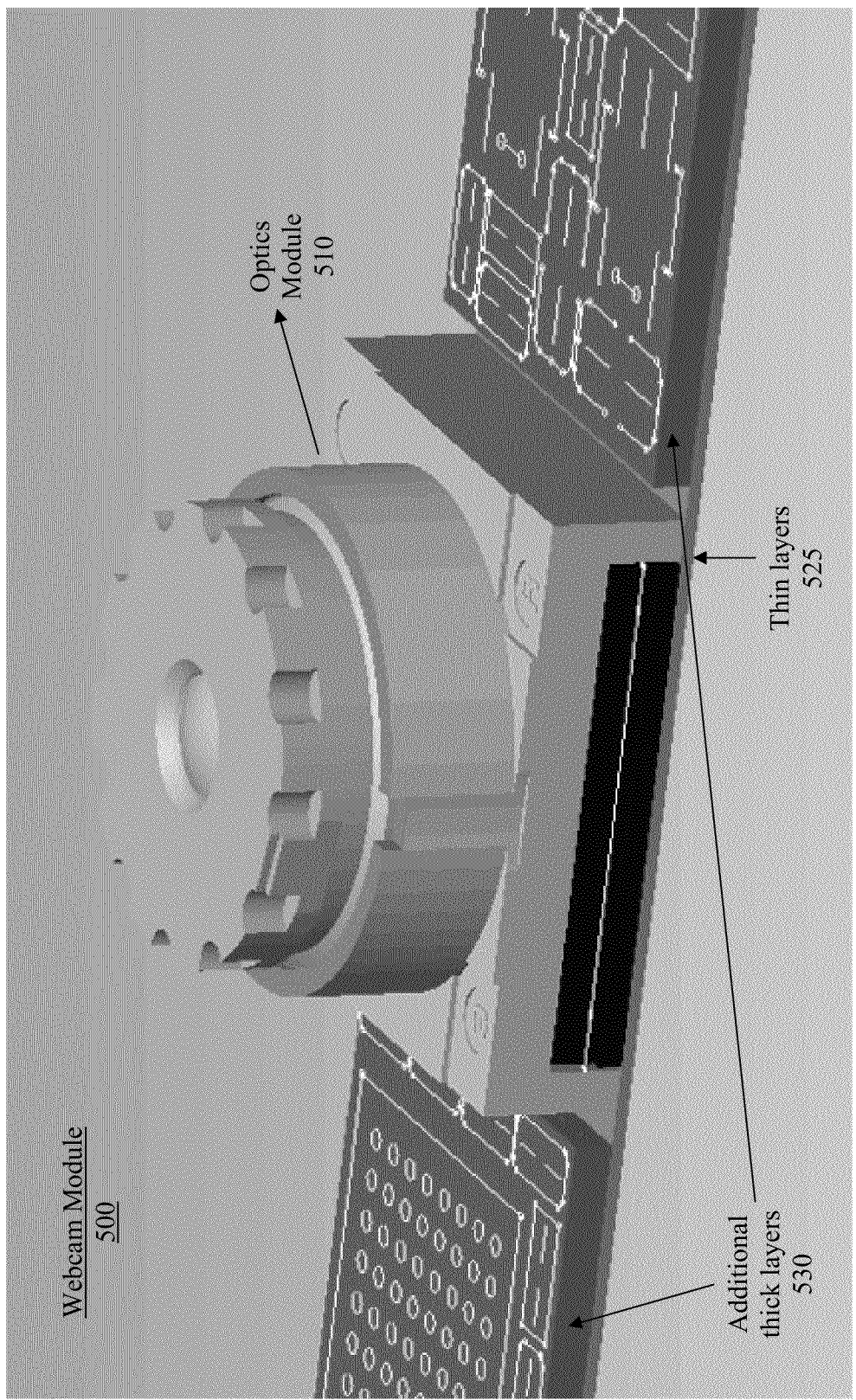
FIG. 5C is a stepped PCB used in a webcam module in accordance with an embodiment of the present invention.
Figure 5D:
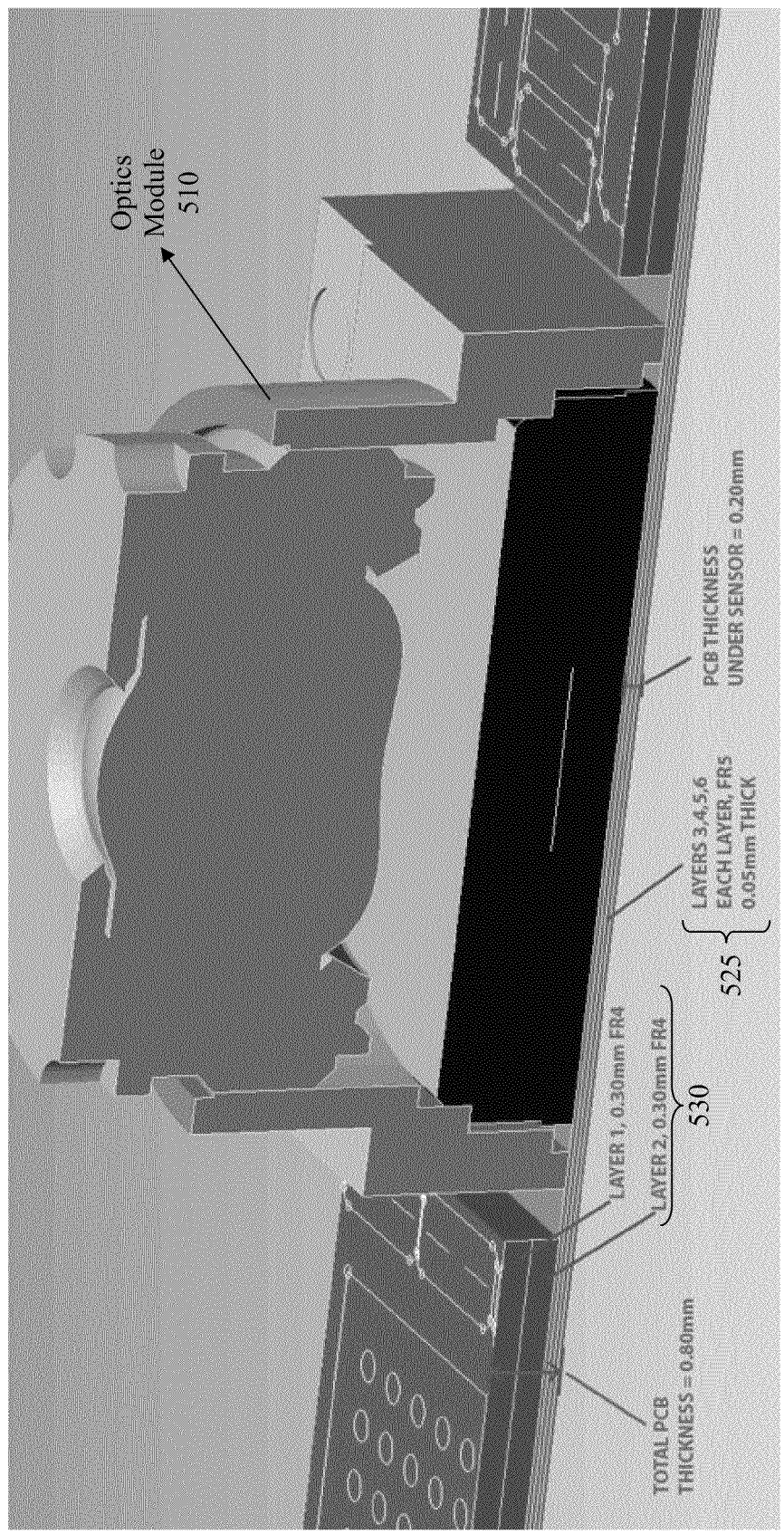
FIG. 5D is a closer view of the PCB shown in FIG. 5C.

As discussed above, for webcam module designs, total module thickness is a key parameter to be minimized. In order to reduce the total height of a webcam module 500, in accordance with some embodiments of the present invention, a PCB 520 is built that contains multiple, thin layers 525 of PCB material under the optics module 510 (including, for example, the sensor 228, lens 126, and lens holder 522) as well as additional, thicker layers of PCB material on either side of the optics module. FIG. 5C shows an example of such a PCB, in accordance with some embodiments of the present invention. In the embodiment shown in FIG. 5C, there are 4 layers of very thin PCB material under the optics module 510, and 2 additional layers 530 of thicker PCB material on either side. This can be more clearly seen in FIG. 5D, which shows the cross-section of the substrate shown in FIG. 5C.

In the specific example discussed above with reference to FIGS. 5A-5D, the optics module 510 gets an extra 0.60 mm. (The total PCB thickness is 0.80 mm, but it is only 0.20 mm in the area of the optics module.) This construction still provides a rigid PCB (since the thicker PCB layers 530 will provide good structural rigidity), while also improving image quality by increasing the space available for the optics module 510, thus allowing for an increased z-distance. In an alternate embodiment, the total height of the webcam module 500 is reduced, thus lending itself to embedding in a thinner display/laptop.

An added benefit is provided by the fact that the thin PCB layers 525 in the above example will have low rigidity. Thus, these thin layers 525 will provide vibration isolation that will protect the delicate die on the sensor in the optics module 510. Vibration will propagate efficiently across the thick, rigid PCB layers 530, but will be significantly dampened across the thin, flexible PCB layers 525.

In one embodiment, an additional stiffener piece (e.g. 0.10 mm thick steel plate) is added to the bottom of the PCB 520 to increase rigidity of the total system. In one embodiment, this stiffener is made of metal, and provides the additional benefits of increased heat dissipation and reduced electromagnetic emissions. In this case, the vibration dampening effect of the thin PCB layers will be reduced.

While particular embodiments and applications of the present invention have been illustrated and described, it is to be understood that the invention is not limited to the precise construction and components disclosed herein. For example, as mentioned earlier, in any of the above embodiments, the embedded webcam module may be detachable from the device in which it is embedded. As another example, different types of connectors, materials, etc. can be used. As still another example, the various embodiments discussed above are applicable not only to laptops, but also to various other devices in which cameras may be embedded, such as cell phones, PDA's, media players, etc. Various other modifications, changes, and variations which will be apparent to those skilled in the art may be made in the arrangement, operation and details of the method and apparatus of the present invention disclosed herein, without departing from the spirit and scope of the invention as defined in the following claims.

What is claimed is:

1. An image capturing module embedded in a display, the image capturing module comprising:
    a sensor; and
    a lens for directing light onto the sensor;
    wherein the display is part of a laptop computer;
    wherein the lens is movable from a first position to a second position,
    wherein the image capturing module provides for a longer optical path between the sensor and the lens when the lens is in the second position than when the lens is in the first position; and
    the image capturing module is configured to automatically move the lens to the first position when the laptop computer is closed.

2. The image capturing module of claim 1, wherein the second position is reached by receiving a pressure upon the image capturing module while the lens is in the first position, allowing the lens to pop out.

3. The image capturing module of claim 1, further comprising a lens housing holding the lens, the lens housing being movable relative to the display.

4. The image capturing module of claim 3, further comprising a lighting element embedded in the lens housing and configured to project light when the lens is in the second position.

5. The image capturing module of claim 4, wherein the lighting element is configured to project light in a direction other than along the optical path.

6. The image capturing module of claim 4, wherein the lighting element is configured to illuminate a keyboard of the laptop computer.

7. The image capturing module of claim 3, wherein the lens housing includes a spring-loaded actuator configured to move the lens to the second position.

8. The image capturing module of claim 7, wherein the lens housing is configured such that receiving a pressure upon the image capturing module when the lens is in the first position releases a latch mechanism and allows the lens to move to the second position via urging of the spring-loaded actuator.

9. A method of operating an image capturing module embedded in a display of a laptop computer, the image capturing module including a sensor and a lens for directing light onto the sensor, the method comprising:
    moving the lens from a pre-configured first position to a pre-configured second position, wherein the image capturing module provides for a longer optical path between the sensor and the lens when the lens is in the second position than when the lens is in the first position;
    capturing image data with the sensor while the lens is in the second position; and
    automatically moving the lens to the first position by closing the laptop computer.

10. The method of claim 9, wherein the image capturing module includes a lens housing holding the lens, the lens housing being movable relative to the display.

11. The method of claim 10, wherein the image capturing module includes a lighting element embedded in the lens housing, the method further comprising projecting light from the lighting element when the lens is in the second position.

12. The method of claim 11, wherein the light is projected in a direction other than along the optical path.

13. The method of claim 11, wherein the light is projected so as to illuminate a keyboard of the laptop computer.

14. The method of claim 9, wherein the lens is moved to the second position via a spring-loaded actuator.

15. The method of claim 14, wherein the lens is moved to the second position by applying a pressure upon the image capturing module when the lens is in the first position, thereby releasing a latch mechanism that allows the lens to move to the second position via urging of the spring-loaded actuator.

* * * * *